United States Patent
Uchimura

(10) Patent No.: US 11,483,616 B2
(45) Date of Patent: Oct. 25, 2022

(54) REPRODUCTION APPARATUS, REPRODUCTION METHOD, PROGRAM, AND RECORDING MEDIUM

(71) Applicant: SONY CORPORATION, Tokyo (JP)

(72) Inventor: Kouichi Uchimura, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/647,263

(22) PCT Filed: Sep. 10, 2018

(86) PCT No.: PCT/JP2018/033419
§ 371 (c)(1),
(2) Date: Mar. 13, 2020

(87) PCT Pub. No.: WO2019/059022
PCT Pub. Date: Mar. 28, 2019

(65) Prior Publication Data
US 2020/0267442 A1    Aug. 20, 2020

(30) Foreign Application Priority Data

Sep. 21, 2017 (JP) .............................. JP2017-181117

(51) Int. Cl.
*H04N 21/435* (2011.01)
*H04N 19/46* (2014.01)
(Continued)

(52) U.S. Cl.
CPC ......... *H04N 21/4358* (2013.01); *G11B 20/12* (2013.01); *H04N 19/46* (2014.11); *H04N 21/84* (2013.01)

(58) Field of Classification Search
CPC .... H04N 21/4358; H04N 21/84; H04N 19/46; G11B 20/12
See application file for complete search history.

(56) References Cited

U.S. PATENT DOCUMENTS

2014/0210847 A1* 7/2014 Knibbeler ............. H04N 9/68
                                                345/589
2016/0142714 A1* 5/2016 Toma ................ H04N 21/4621
                                                375/240.25
(Continued)

FOREIGN PATENT DOCUMENTS

CN    106104689 A    11/2016
CN    106165403 A    11/2016
(Continued)

OTHER PUBLICATIONS

Tao et al., Indication of SMPTE 2094-40 metadata in HEVC, Joint Collaborative Team on Video Coding (JCT-VC) of ITU-T SG 16 WP 3 and ISO/IEC JTC 1/SC 29/WG 11, May 26-Jun. 1, 2016, pp. 1-5, 24th Meeting: Geneva, CH.
(Continued)

*Primary Examiner* — Randy A Flynn
(74) *Attorney, Agent, or Firm* — Paratus Law Group, PLLC

(57) ABSTRACT

A reproduction apparatus, a reproduction method, a program, and a recording medium configured to stabilize display upon starting of reproduction of an HDR video stream. The reproduction apparatus according to one aspect of the present technology decodes, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream, and adds the dynamic metadata to video data obtained by the decod-
(Continued)

ing and outputs resulting data to a display apparatus. The present technology can be applied to a Blu-ray Disc player.

17 Claims, 38 Drawing Sheets

(51) Int. Cl.
　　*G11B 20/12*　　(2006.01)
　　*H04N 21/84*　　(2011.01)

(56) References Cited

U.S. PATENT DOCUMENTS

| | | | |
|---|---|---|---|
| 2016/0301959 A1* | 10/2016 | Oh | H04N 21/234327 |
| 2016/0330513 A1 | 11/2016 | Toma et al. | |
| 2016/0373712 A1* | 12/2016 | Yamamoto | H04N 21/4854 |
| 2017/0018292 A1* | 1/2017 | Yahata | H04N 5/85 |
| 2017/0104973 A1* | 4/2017 | Toma | H04N 21/431 |
| 2017/0251161 A1* | 8/2017 | Toma | H04N 21/43635 |
| 2017/0256039 A1* | 9/2017 | Hsu | G09G 5/02 |
| 2018/0025464 A1* | 1/2018 | Yeung | H04N 5/20 348/234 |
| 2018/0063500 A1* | 3/2018 | Rusanovskyy | H04N 21/4854 |

FOREIGN PATENT DOCUMENTS

| | | |
|---|---|---|
| EP | 3163890 A1 | 5/2017 |
| JP | 2016-034125 A | 3/2016 |
| JP | 2017-139052 A | 8/2017 |
| WO | WO 2016/027423 A1 | 2/2016 |
| WO | WO 2016/027426 A1 | 2/2016 |

OTHER PUBLICATIONS

Jun. 5, 2020, European Search Report issued for related EP application No. 18857707.6.

* cited by examiner

FIG. 3

```
Static metadata(SMPTE ST 2086)

1: EOTF
 2: Max CLL
 3: Max FALL
 4: for(i=0;i<3;i++) {
 5:   Display primaries[x]
 6:   Display primaries[y]
 7: }
 8: White point[x]
 9: White point[y]
10: Max display mastering luminance
11: Min display mastering luminance
```

FIG.4
A
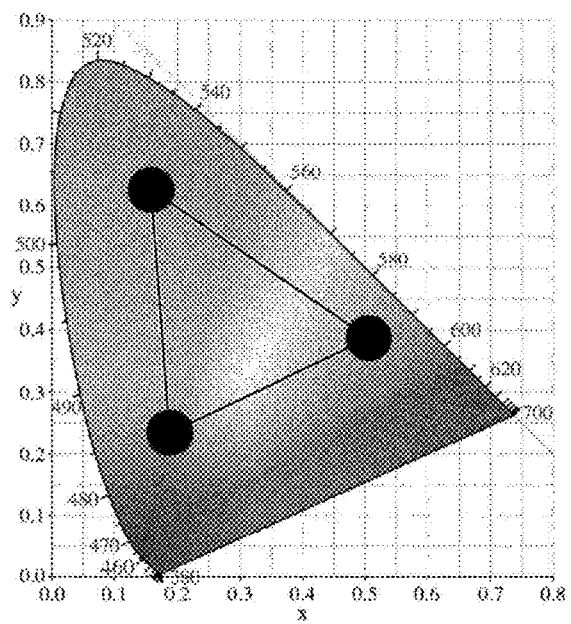
B
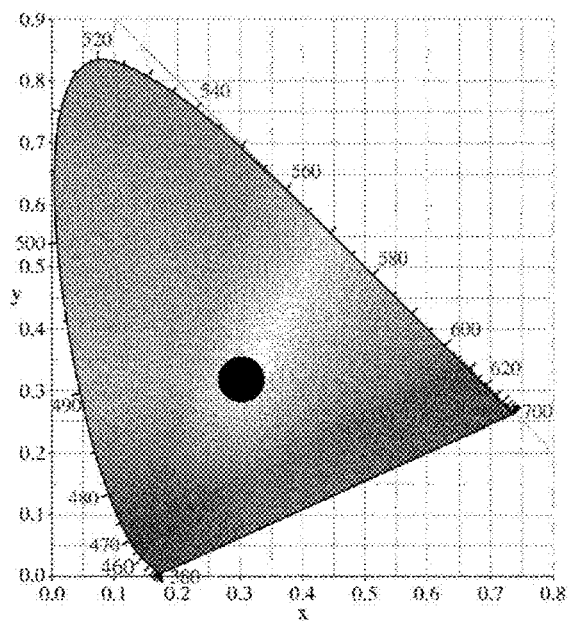

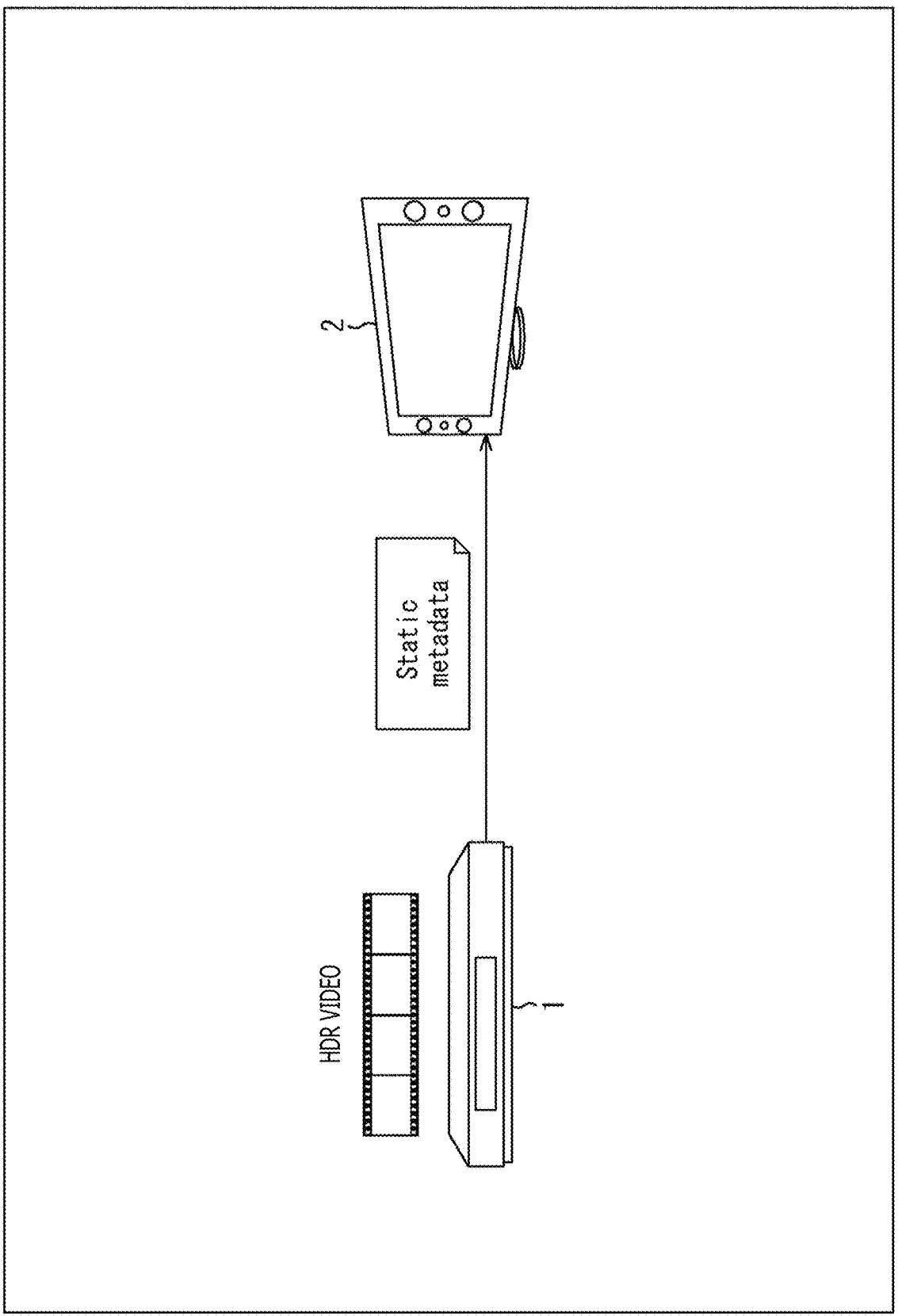

FIG. 6

```
Dynamic metadata(SMPTE ST 2094)

1: For(windows) {(max3)
 2:   Window size, location
 3:   Internal Ellipse size, location
 4:   External Ellipse size, location
 5:   Rotation angle(0-180)
 6:   Overlap process option
 7:   maxscl
 8:   average max rgb
 9:   Distribution max rgb percentages (max15)
10:   Distribution max rgb percentiles (max15)
11:   Fraction bright pixels
12:   Knee point
13:   Bezier curve anchors(max15)
14:   Color saturation weight
15: }
16: Target system display max luminance
17: Local display luminance(2×2-25×25)
18: Local mastering display luminance(2×2-25×25)
```

FIG. 16

| Syntax | No. of bits | Mnemonic |
|---|---|---|
| Disc_Info(){ | | |
|   lenght | 32 | uimsbf |
|   disc_type | 4 | bslbf |
|   reserved_for_future_use | 3 | bslbf |
|   4K_content_exist_flag | 1 | bslbf |
|   HDR_content_exist_flags | 16 | bslbf |
|   reserved_for_future_use | 40 | bslbf |
| } | | |

FIG.17

| reserved | Dynamic HDR | Option HDR A | Option HDR B | BDMV HDR | SDR |
|---|---|---|---|---|---|
| 1 | 1 | ... | ... | 1 | 1 |

FIG. 18

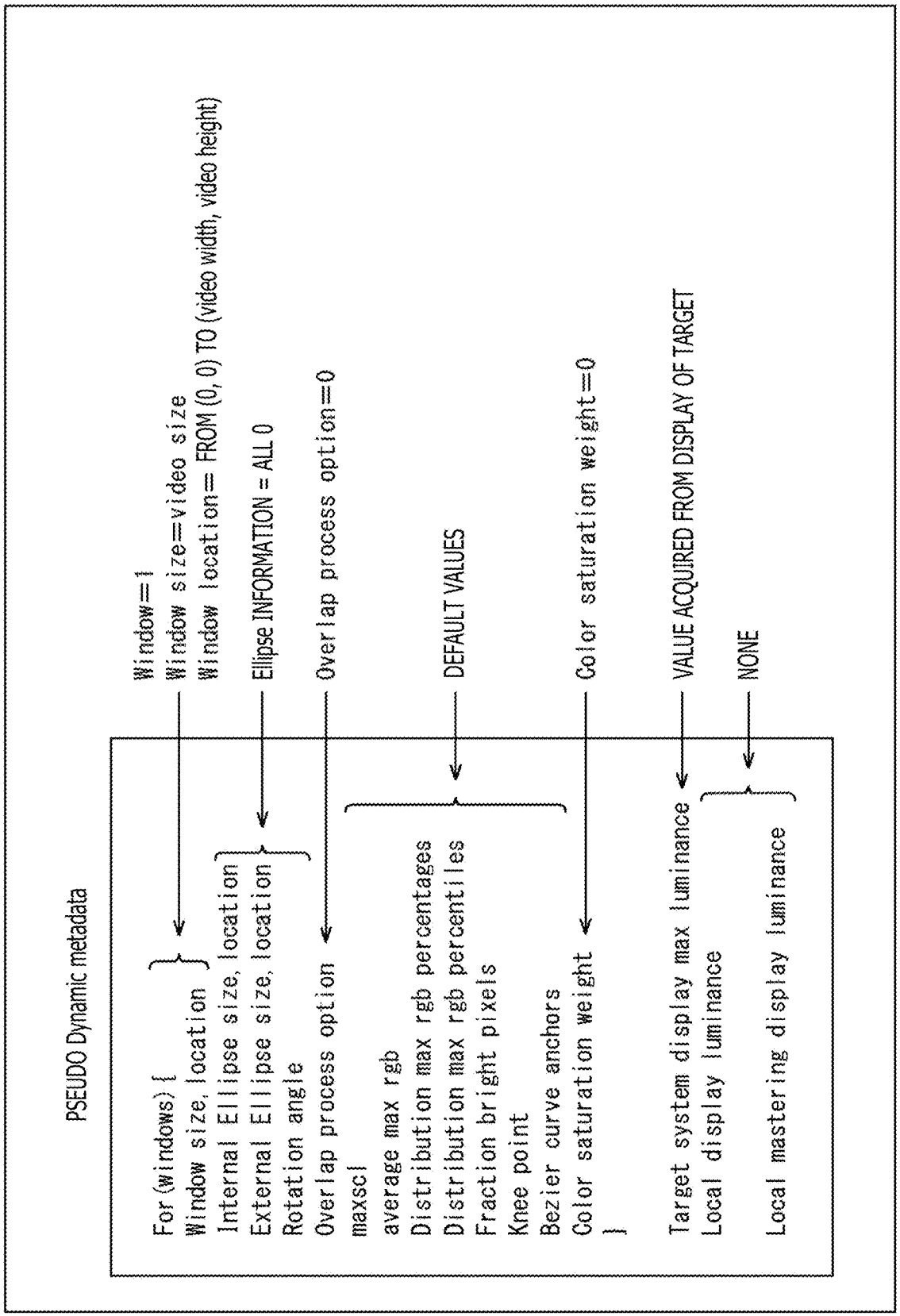

PSEUDO Dynamic metadata

```
For (windows) {
    Window size, location          → Window=1
                                     Window size=video size
                                     Window location= FROM (0, 0) TO (video width, video height)
    Internal Ellipse size, location
    External Ellipse size, location → Ellipse INFORMATION = ALL 0
    Rotation angle
    Overlap process option          → Overlap process option=0
    maxscl
    average max rgb
    Distribution max rgb percentages
    Distribution max rgb percentiles  → DEFAULT VALUES
    Fraction bright pixels
    Knee point
    Bezier curve anchors
    Color saturation weight         → Color saturation weight=0
}
Target system display max luminance → VALUE ACQUIRED FROM DISPLAY OF TARGET
Local display luminance             ⎫
                                    ⎬ NONE
Local mastering display luminance   ⎭
```

FIG. 21

```
org.blurayx.uhd.hdr.DynamicHDRMetadataControl methods
1: org.blurayx.uhd.hdr.DynamicHDRMetadataControl#setDynamicHDRMetadata(DynamicHDRMetadata)
2: org.blurayx.uhd.hdr.DynamicHDRMetadataControl#getDynamicHDRMetadata()
```

FIG. 22

```
org.blurayx.uhd.hdr.DynamicHDRMetadata methods
1:org.blurayx.uhd.hdr.DynamicHDRMetadata#createInstance()
2:org.blurayx.uhd.hdr.DynamicHDRMetadata#setWindow(Window window, int window_number)
3:org.blurayx.uhd.hdr.DynamicHDRMetadata#getWindow(int window_number)
4:org.blurayx.uhd.hdr.DynamicHDRMetadata#setTargetDisplayLuminance(int maxLuminance)
5:org.blurayx.uhd.hdr.DynamicHDRMetadata#getTargetDisplayLuminance()
6:org.blurayx.uhd.hdr.DynamicHDRMetadata#setLocalDisplayLuminance(int[][] luminances)
7:org.blurayx.uhd.hdr.DynamicHDRMetadata#getLocalDisplayLuminance()
8:org.blurayx.uhd.hdr.DynamicHDRMetadata#setLocalMasteringDisplayLuminance(int[][] luminances)
9:org.blurayx.uhd.hdr.DynamicHDRMetadata#getLocalMasteringDisplayLuminance()
```

FIG. 23 org.blurayx.uhd.hdr.Window methods
1:org.blurayx.uhd.hdr.Window#createInstance()
2:org.blurayx.uhd.hdr.Window#setLocation(java.awt.Rectangle location)
3:org.blurayx.uhd.hdr.Window#getLocation()
4:org.blurayx.uhd.hdr.Window#setInternalEllipse(java.awt.Rectangle location, int angle)
5:org.blurayx.uhd.hdr.Window#getInternalEllipseSize()
6:org.blurayx.uhd.hdr.Window#getInternalEllipseAngle()
7:org.blurayx.uhd.hdr.Window#setExternalEllipse(java.awt.Rectangle location, int angle)
8:org.blurayx.uhd.hdr.Window#getExternalEllipseSize()
9:org.blurayx.uhd.hdr.Window#getExternalEllipseAngle()
10:org.blurayx.uhd.hdr.Window#setOverlapProcess(int process)
11:org.blurayx.uhd.hdr.Window#getOverlapProcess()
12:org.blurayx.uhd.hdr.Window#setMaxSCL(int maxSCL)
13:org.blurayx.uhd.hdr.Window#getMaxSCL()
14:org.blurayx.uhd.hdr.Window#setAverageMaxRGB(int averageMaxRGB)
15:org.blurayx.uhd.hdr.Window#getAverageMaxRGB()
16:org.blurayx.uhd.hdr.Window#setDistributionMaxRGB(int[] values)
17:org.blurayx.uhd.hdr.Window#getDistributionMaxRGB()
18:org.blurayx.uhd.hdr.Window#setFractionBrightPixels(int values)
19:org.blurayx.uhd.hdr.Window#getFractionBrightPixels()
20:org.blurayx.uhd.hdr.Window#setKneePoint(int x, int y)
21:org.blurayx.uhd.hdr.Window#getKneePointx()
22:org.blurayx.uhd.hdr.Window#getKneePointy()
23:org.blurayx.uhd.hdr.Window#setBezierCurveAnchors(int[] anchors)
24:org.blurayx.uhd.hdr.Window#getBezierCurveAnchors()
25:org.blurayx.uhd.hdr.Window#setColorSaturationWeight(int weight)
26:org.blurayx.uhd.hdr.Window#getColorSaturationWeight()

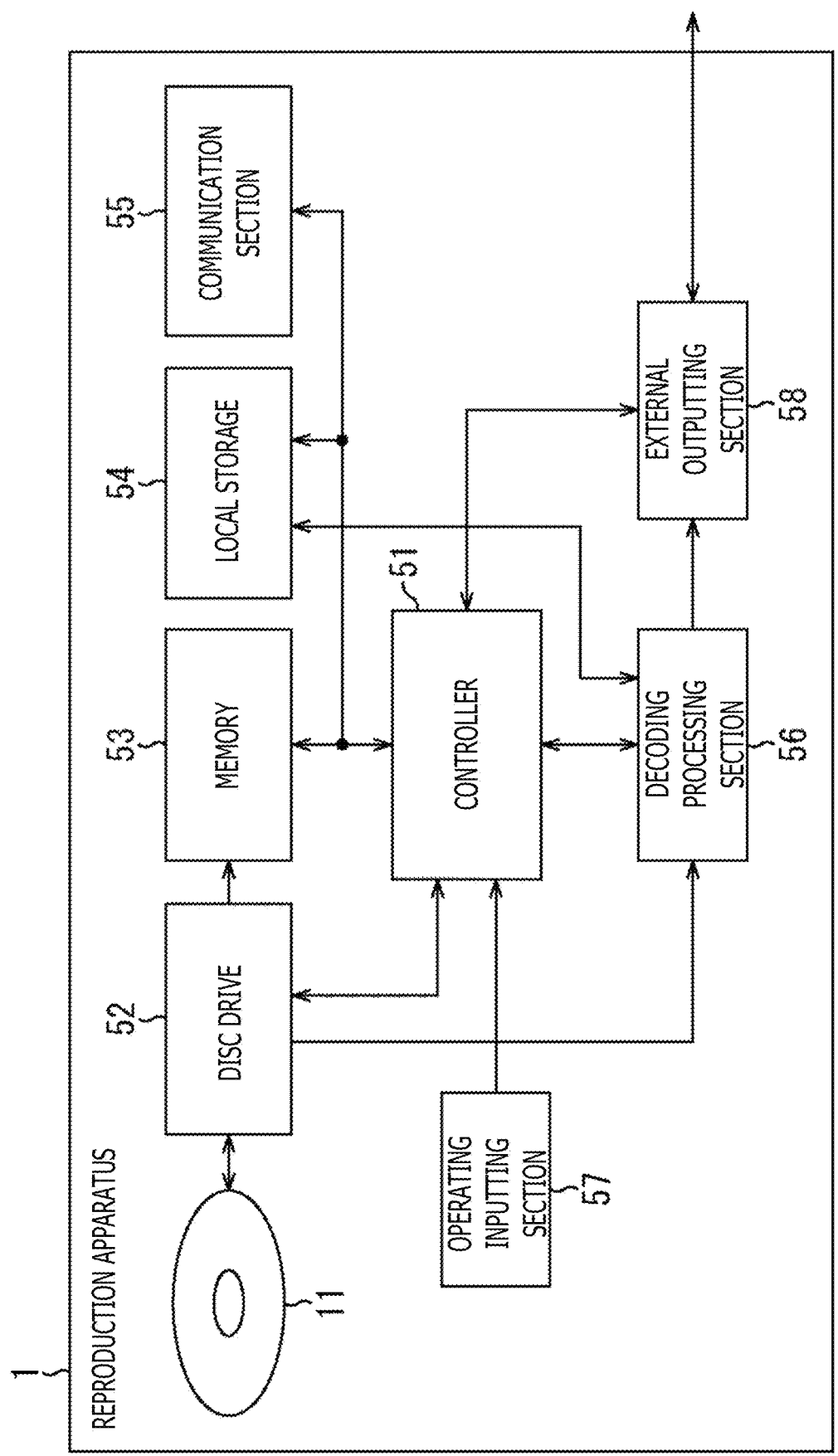

REPRODUCTION APPARATUS, REPRODUCTION METHOD, PROGRAM, AND RECORDING MEDIUM

CROSS REFERENCE TO PRIOR APPLICATION

This application is a National Stage Patent Application of PCT International Patent Application No. PCT/JP2018/033419 (filed on Sep. 10, 2018) under 35 U.S.C. § 371, which claims priority to Japanese Patent Application No. 2017-181117 (filed on Sep. 21, 2017), which are all hereby incorporated by reference in their entirety.

TECHNICAL FIELD

The present technology relates to a reproduction apparatus, a reproduction method, a program, and a recording medium, and particularly to a reproduction apparatus, a reproduction method, a program, and a recording medium that make it possible to stabilize display upon starting of reproduction of an HDR video stream.

BACKGROUND ART

Ultra HD Blu-ray (registered trademark) Disc (UHD BD) is a BD standard ready for recording of an HDR (High Dynamic Range) video that is a video having an extended dynamic range. While the highest luminance of an SDR (Standard Dynamic Range) video is 100 nits (100 cd/m$^2$), the highest luminance of the HDR video is, for example, 10,000 nits exceeding the highest luminance of the SDR video.

In UHD BD, it is possible to record an HDR video stream for which an HDR technology called "HDR10" is used.

In the HDR10, it is made possible to set information of the highest luminance (Max CLL (Maximum Content Light Level)) in a unit of a content in metadata called Static metadata. On the TV side, adjustment of the luminance of the HDR video is performed suitably on the basis of Static metadata transmitted thereto from a BD player.

CITATION LIST

Patent Literature

[PTL 1]
Japanese Patent Laid-Open No. 2017-139052

SUMMARY

Technical Problem

As metadata for the HDR video stream, Dynamic metadata that is metadata including luminance information of a unit of a video frame is prescribed by SMPTE ST 2094. Upon reproduction of an HDR video stream to which Dynamic metadata is added, the Dynamic metadata is transmitted together with pictures from the player side to the TV side.

Also it is examined to make it possible to record an HDR video stream to which Dynamic metadata is added on a BD.

It possibly occurs in the future that both an HDR video stream to which Dynamic metadata is added and an HDR video stream to which Dynamic metadata is not added and for which adjustment of the luminance is to be performed on the basis of Static metadata exist in a mixed manner on one BD. In a case where changeover of transmission setting or changeover of a display mode occurs at a timing such as a timing at which reproduction of an HDR video stream is started, there is the possibility that the screen image of a display unit may darken momentarily.

The present technology has been made in view of such a situation as described above and makes it possible to stabilize display upon starting of reproduction of an HDR video stream.

Solution to Problem

A reproduction apparatus according to one aspect of the present technology includes: a decoding section decoding, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream; and an output controlling section adding the dynamic metadata to video data obtained by the decoding and outputting resulting data to a display apparatus.

A recording medium according to another aspect of the present technology has recorded therein: a first HDR video stream to which dynamic metadata including luminance information of a unit of a video frame is added; a second HDR video stream to which the dynamic metadata is not added and with which static metadata including luminance information of a unit of a content is associated; a playlist file having the static metadata described therein, the playlist file including reproduction re-controlling information of the second HDR video stream; and an index file in which a flag representative of a type of an HDR video stream is described, the index file including a bit indicative of whether or not the first HDR video stream is recorded and a bit indicative of whether or not the second HDR video stream is recorded.

In the present technology, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream is decoded, and the dynamic metadata is added to video data obtained by the decoding and resulting data is outputted to a display apparatus.

Advantageous Effect of Invention

With the present technology, display upon reproduction starting of an HDR video stream can be stabilized.

It is to be noted that the advantageous effect described here is not always restrictive and may be some effect described in the present disclosure.

BRIEF DESCRIPTION OF DRAWINGS

FIG. 3 is a view depicting Static metadata prescribed by SMPTE ST 2086.

FIG. 4 is a view depicting a CIE color space.

FIG. 5 is a view depicting an example of transmission of Static metadata.

FIG. 6 is a view depicting Dynamic metadata prescribed by SMPTE ST 2094-40.

FIG. 16 is a view depicting a syntax of Disc_Info( ) described in an Index table.

FIG. 17 is a view depicting an example of setting of HDR_content_exist_flags.

FIG. 18 is a view depicting an example of generation of pseudo Dynamic metadata for which a default value is used.

FIG. 21 is a view depicting an example of a class of an API of a BD-J.

FIG. 22 is a view depicting another example of a class of an API of a BD-J.

FIG. 23 is a view depicting a further example of a class of an API of a BD-J.

FIG. 24 is a block diagram depicting a configuration example of the reproduction apparatus.

DESCRIPTION OF EMBODIMENT

In the following, a mode for carrying out the present technology is described. The description is given in the following order.

1. Metadata for HDR Video
2. Transmission of Metadata
3. BD Format
4. Generation Method of Pseudo Dynamic Metadata
5. Configuration and Operation of Reproduction Apparatus
6. Configuration and Operation of Other Apparatuses
7. Other Configuration Examples of Reproduction System
8. Other Examples 1. Metadata for HDR Video FIG. 1 is a view depicting a configuration example of a reproduction system for an HDR content.

Figure 1:
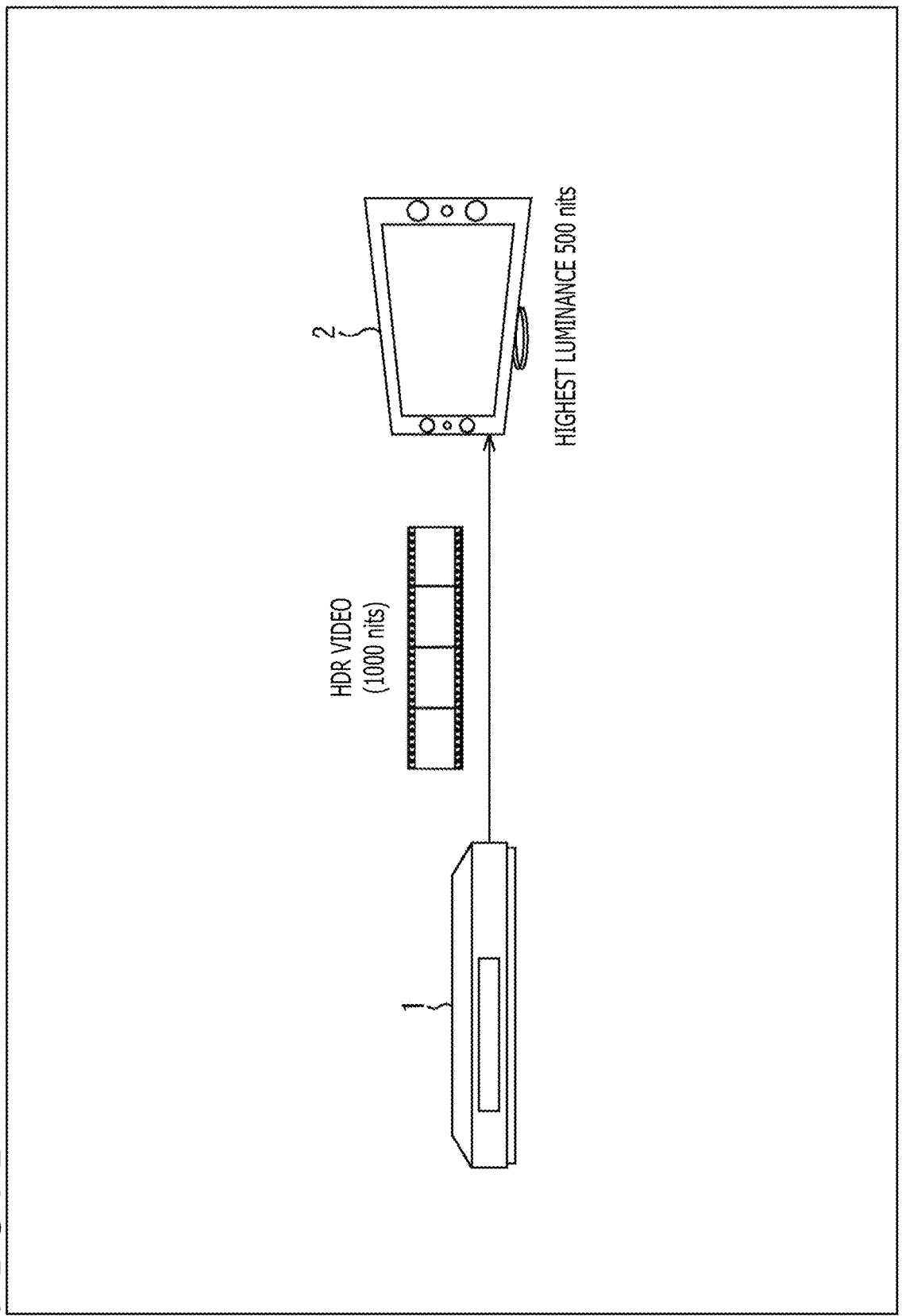
FIG. 1 is a view depicting a configuration example of a reproduction system of an HDR content.

The reproduction system of FIG. 1 is configured by connecting a reproduction apparatus 1 and a TV (television receiver) 2 to each other through a cable of a predetermined standard such as HDMI (registered trademark) (High-Definition Multimedia Interface) 2.0a or HDMI 2.1. The reproduction apparatus 1 and the TV 2 may be connected to each other through a wireless interface.

The reproduction apparatus 1 is an apparatus ready for reproduction of an HDR content such as a UHD BD player. A BD on which an HDR content is recorded is loaded into a drive of the reproduction apparatus 1. Not only data of an HDR video but also audio data is included in contents to be reproduced by the reproduction apparatus 1.

The TV 2 has a function for displaying a video inputted from the outside in addition to a function for receiving and displaying a program transmitted through a broadcasting wave or a network as a transmission path. A display device the TV 2 has is a display ready for displaying of an HDR video whose luminance exceeds 100 nits.

Before transmission of a content is started, the reproduction apparatus 1 and the TV 2 perform transmission setting (configuration) of HDMI by transfer of information relating to individual performances therebetween. For example, a notification that transmission of an HDR video is to be performed is issued from the reproduction apparatus 1 to the TV 2. Further, a notification of the highest luminance of the display of the TV 2 is issued from the TV 2 to the reproduction apparatus 1.

After such transmission setting, the reproduction apparatus 1 decodes an HDR video stream read out from the BD and outputs pictures of the HDR video to the TV 2. The TV 2 receives the pictures transmitted from the reproduction apparatus 1 and displays the pictures thereon.

At this time, in the TV 2, a process for adjusting (compressing) the luminance of the HDR video transmitted from the reproduction apparatus 1 is performed suitably in accordance with the performances of the display. The luminance compression is performed in a case where the luminance of the HDR video outputted from the reproduction apparatus 1 is higher than the highest luminance of the display of the TV 2.

In the example of FIG. 1, it is assumed that the luminance of the HDR video outputted from the reproduction apparatus 1 is 1,000 nits and the highest luminance of the display of the TV 2 is 500 nits.

Figure 2:
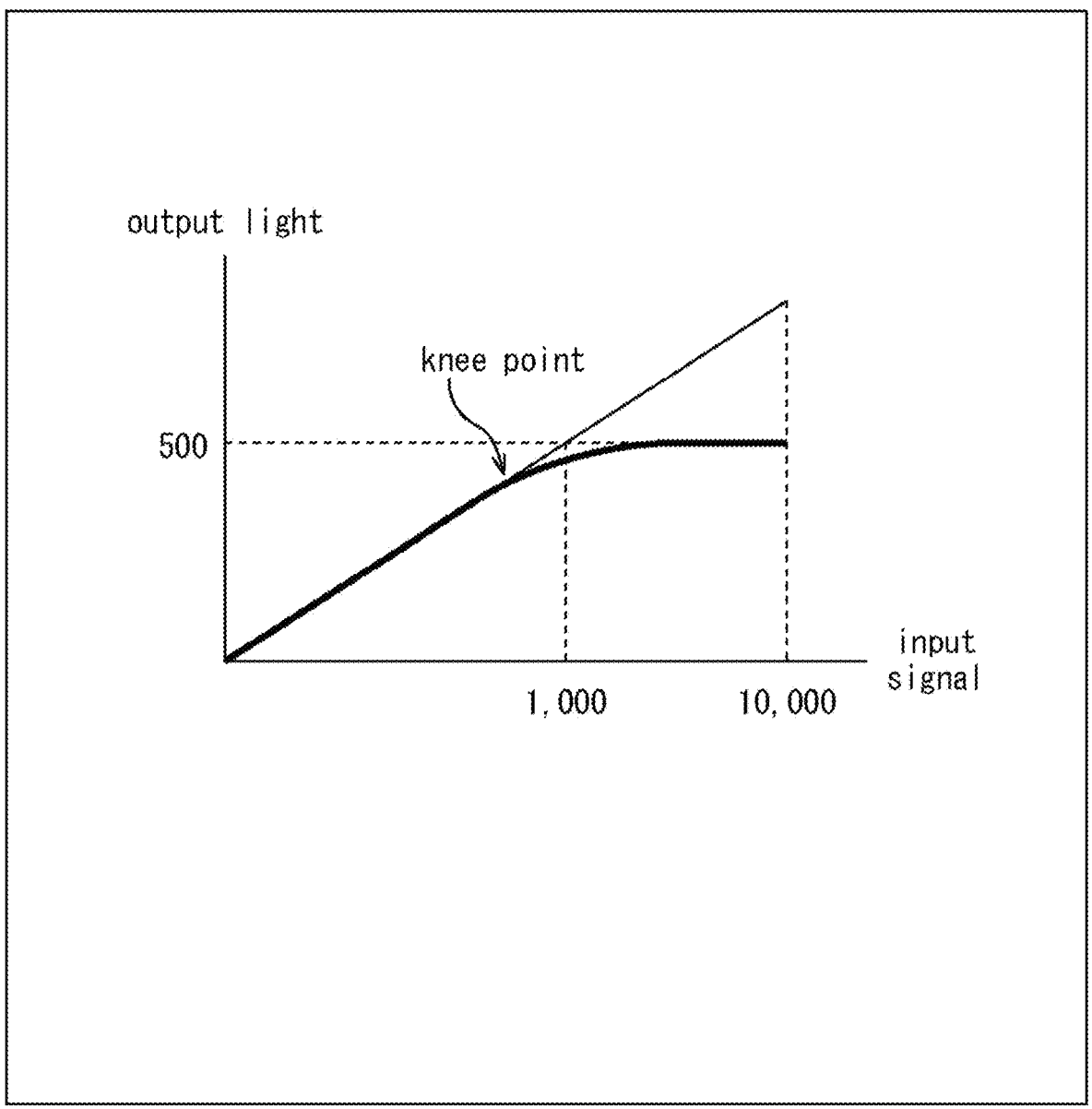
FIG. 2 is a view depicting an example of a tone curve used for luminance compression of an HDR video.

FIG. 2 is a view depicting an example of a tone curve used for luminance compression of an HDR video.

The axis of abscissa of FIG. 2 represents the luminance of an input signal and the axis of ordinate represents the luminance of an output (display). For example, an EOTF (Electro-Optical Transfer Function) process for which a PQ (Perceptual Quantization) curve prescribed by SMPTE ST 2084 is used is performed on the TV 2 side, and compression is performed such that the luminance of the HDR video becomes within a range of 500 nits that is the highest luminance of the display.

It is to be noted that a point that is indicated by an arrow mark in FIG. 2 and at which the representation of brightness loses its linearity is referred to as knee point.

In this manner, in the reproduction system of FIG. 1, in a case where the display of the TV 2 does not have sufficient luminance with respect to the luminance of the HDR video outputted from the reproduction apparatus 1, luminance compression is performed by the TV 2 side.

From the reproduction apparatus 1 to the TV 2, metadata including luminance information of a content is transmitted as auxiliary information for luminance compression. The following two kinds of metadata are available as metadata to be used as auxiliary information for luminance compression.

Static metadata
Dynamic metadata

The Static metadata is metadata for representing luminance information of a content in a unit of a content and is standardized as SMPTE ST 2086.

On the other hand, the Dynamic metadata is metadata that dynamically represents luminance information of a content in a unit of a frame (picture) and is standardized as SMPTE ST 2094.

Each type of metadata is described below.

<1-1. Static Metadata>

FIG. 3 is a view depicting Static metadata prescribed by SMPTE ST 2086.

EOTF indicates an EOTF of the content. In the TV 2, luminance compression is performed using the EOTF designated here.

Max CLL indicates a maximum luminance from among luminances of pictures included in the overall content.

Max FALL indicates an average luminance of the content.

Display primaries[x] indicates an x value of a CIE color space that can be displayed by a display used for creation of the content.

Display primaries[y] indicates a y value of the CIE color space that can be displayed by the display used for creation of the content.

Three points in such a CIE color space as depicted in A of FIG. 4 are represented using Display primaries[x] in the fifth row and Display primaries[y] in the sixth row. The display used for creation of the content is a display that can express colors on the inner side of a triangle indicated in A of FIG. 4.

White point[x] indicates an x value of a white point in the CIE color space of the display used for creation of the content.

White point[y] indicates a y value of a white point in the CIE color space of the display used for creation of the content.

Such a White point in the CIE color space as depicted in B of FIG. 4 is expressed using White point[x] in the eighth row and White point[y] in the ninth row. The display used for creation of the content is a display on which a position in the CIE color space indicated by a black round mark in B of FIG. 4 is the White point (reference position).

Max display mastering luminance indicates a maximum luminance of the display used for creation of the content.

Min display mastering luminance indicates a minimum luminance of the display used for creation of the content.

In this manner, according to the Static metadata, attributes of the content are indicated by EOTF, Max CLL, and Max FALL in the first to third rows, and attributes of the display used for creation of the content are indicated by the parameters in the fourth and succeeding rows.

As hereinafter described, in a BD, Static metadata is described in a PlayList prepared in an associated relation with an HDR video stream. The PlayList is information used for reproduction of the HDR video stream. In a case where a PlayList file is read out from the BD, the Static metadata described in the PlayList is transmitted to the TV 2.

FIG. 5 is a view depicting an example of transmission of Static metadata.

As depicted in FIG. 5, Static metadata is transmitted from the reproduction apparatus 1 to the TV 2 before reproduction of an HDR video is started. In the TV 2, luminance compression of the HDR video to be transmitted thereto later is performed on the basis of the Static metadata.

According to the Static metadata, since only a luminance that is a representative value of a content can be designated using Max CLL and Max FALL, same luminance adjustment is performed also for pictures of scenes having different luminances. By designating a luminance for each picture, metadata that allows luminance adjustment according to a scene becomes Dynamic metadata.

<1-2. Dynamic Metadata>

FIG. 6 is a view depicting Dynamic metadata prescribed by SMPTE ST 2094-40.

Figure 7:
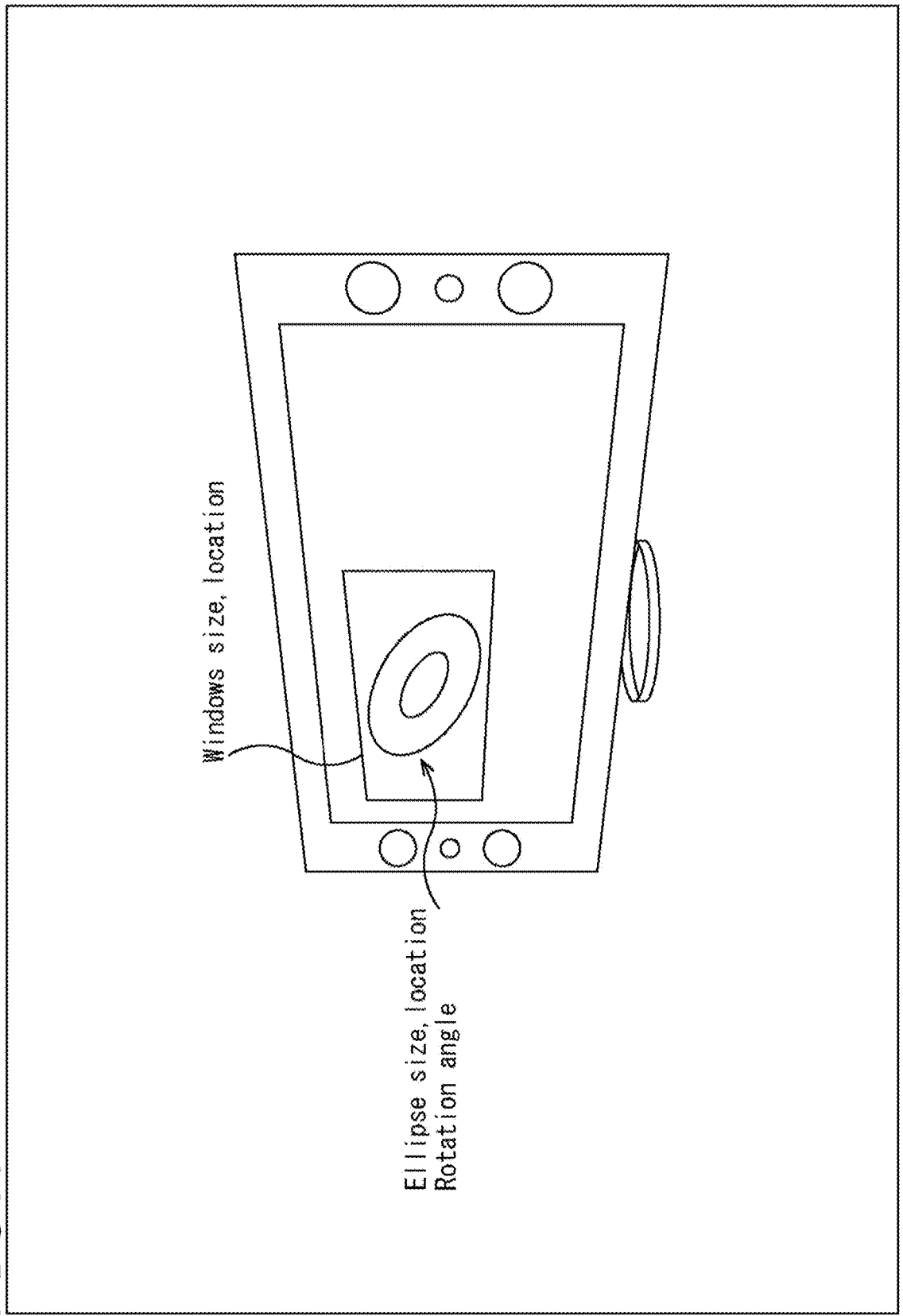
FIG. 7 is a view depicting an example of a Window.

As indicated by the first row in FIG. 6, information of a Window set to a frame is described in Dynamic metadata. As depicted in FIG. 7, the Window is a rectangular region set in a frame. Three Windows at maximum can be set in one frame.

Parameters indicated in the second to 14th rows are described for each Window set in a frame.

Window size and Window location indicate a size and a position of the Window, respectively.

Internal Ellipse size and Internal Ellipse location indicate a size and a position of an ellipse on the inner side from between two ellipses set in the Window, respectively. As depicted in FIG. 7, it is possible to set an ellipse in the Window and designate a luminance in the ellipse.

External Ellipse size and External Ellipse location indicate a size and a position of the outer side ellipse from between the two ellipses set in the Window, respectively.

Rotation angle indicates an inclination of the two ellipses set in the Window.

Overlap process option indicates a processing method of pixels in the ellipses.

maxscl indicates RGB values of a pixel brightest in the Window.

average max rgb indicates an average of values greatest among R, G, and B of the pixels in the Window.

Distribution max rgb percentages indicates ranking in bright luminance in the Window in percentage.

Distribution max rgb percentiles indicates ranking of the bright luminance in the Window in rank (percentile).

Fraction bright pixels indicates a degree by which a maximum luminance value in a scene is drawn.

Knee point indicates a luminance value of the knee point described hereinabove.

Bezier curve anchors indicates a sample x, y of the brightness exceeding the knee point.

Color saturation weight indicates a value to be used for correction of RGB values that change when luminance compression is performed on a supposed display (Target display).

Target System display max luminance indicates a luminance of the supposed display. It is designated by Target System display max luminance that a content has been created supposing that the content is to be displayed on such a display.

Local display luminance indicates a maximum luminance value of each area in a case where the display is divided into vertical and horizontal 2×2 to 25×25 areas.

Local mastering display luminance indicates a maximum luminance value of each area in a case where the mastering display is divided into vertical and horizontal 2×2 to 25×25 areas.

In this manner, in the Dynamic metadata, attributes of a frame (a Window in a frame) are indicated by the parameters in the first to 15th rows. Further, attributes of a supposed display are indicated by the parameters in the 16th and 17th rows, and an attribute of a display used for creation of the content is indicated by the parameter in the 18th row.

Figure 8:
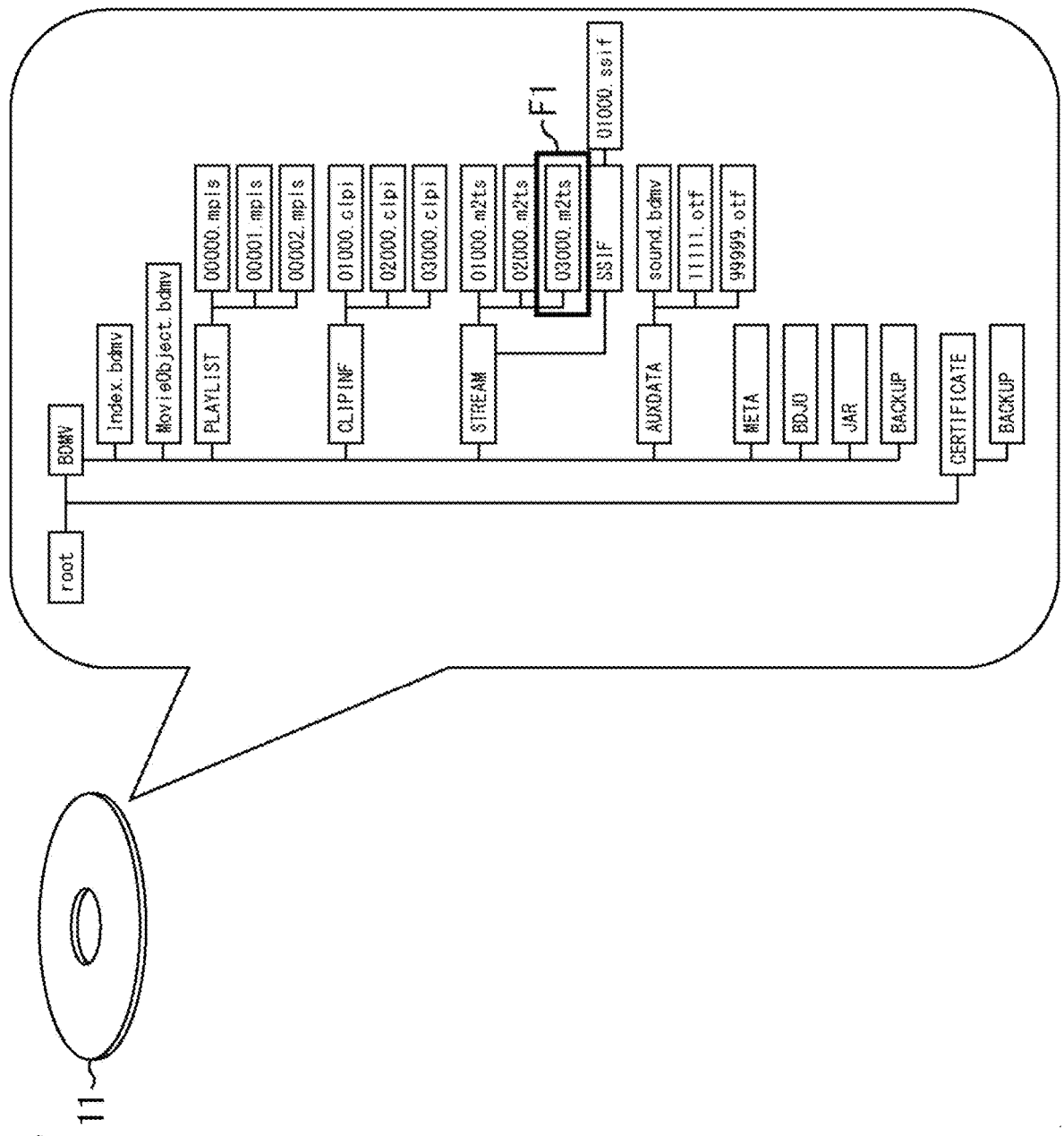
FIG. 8 is a view depicting a file structure of a BD.

FIG. 8 is a view depicting a file structure of a BD.

Although details are hereinafter described, an AV stream file having an m2ts extension set thereto is placed in a STREAM directory set under a BDMV directory.

An AV stream file is a file of MPEG-2 TS obtained by multiplexing a video stream, an audio stream, a subtitle stream, and so forth by MPEG-2. In the example of FIG. 8, AV stream files "01000.m2ts," "02000.m2ts," and "03000.m2ts" are placed in the STREAM directory.

An HDR video stream is an encoded stream of, for example, HEVC (High Efficiency Video Coding). Dynamic metadata is included as an SEI (Supplemental Enhancement Information) message of HEVC in the HDR video stream.

Figure 9:
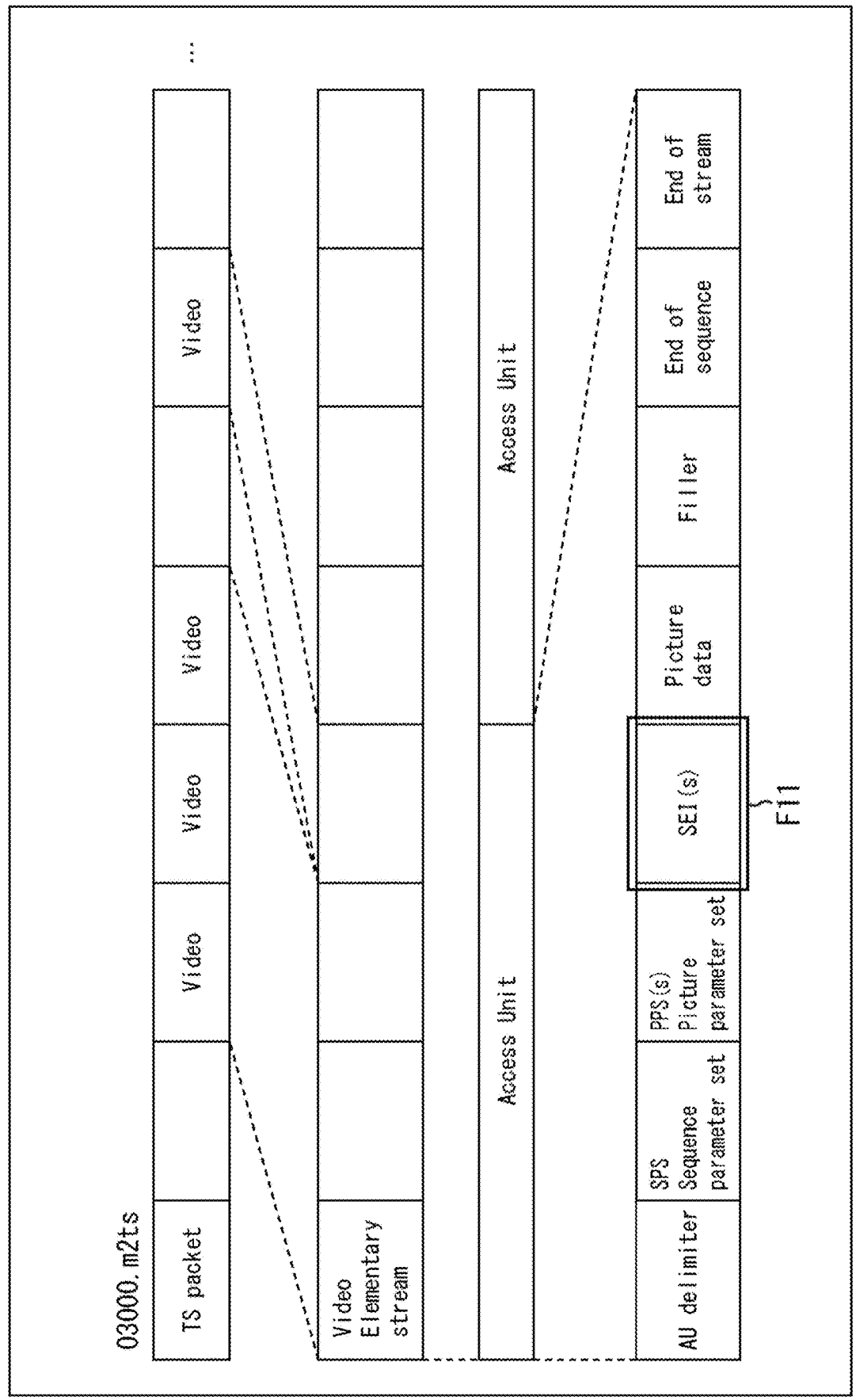
FIG. 9 is a view depicting an example of a structure of an AV stream.

FIG. 9 is a view depicting an example of a structure of the AV stream of "03000.m2ts" indicated by a surrounding frame F1 in FIG. 8.

As indicated at the top stage of FIG. 9, the AV stream of "03000.m2ts" includes TS packets in each of which video data, audio data, subtitle data, or the like is placed. TS packets of a video are gathered to configure a Video Elementary stream.

The Video Elementary stream includes a line of Access Units, and one Access Unit becomes data of one picture of the HDR video. Each Access Unit includes parameters such as SPS and PPS following AU delimiter and includes an SEI message as indicated by a surrounding frame F11.

This SEI message includes Dynamic metadata described hereinabove. It is to be noted that, following the SEI message, data of the HDR video is included as Picture data.

In this manner, in the BD, Dynamic metadata is included in an HDR video stream in such a form that it is added to each picture and is multiplexed together with an audio stream and so forth.

Figure 10:
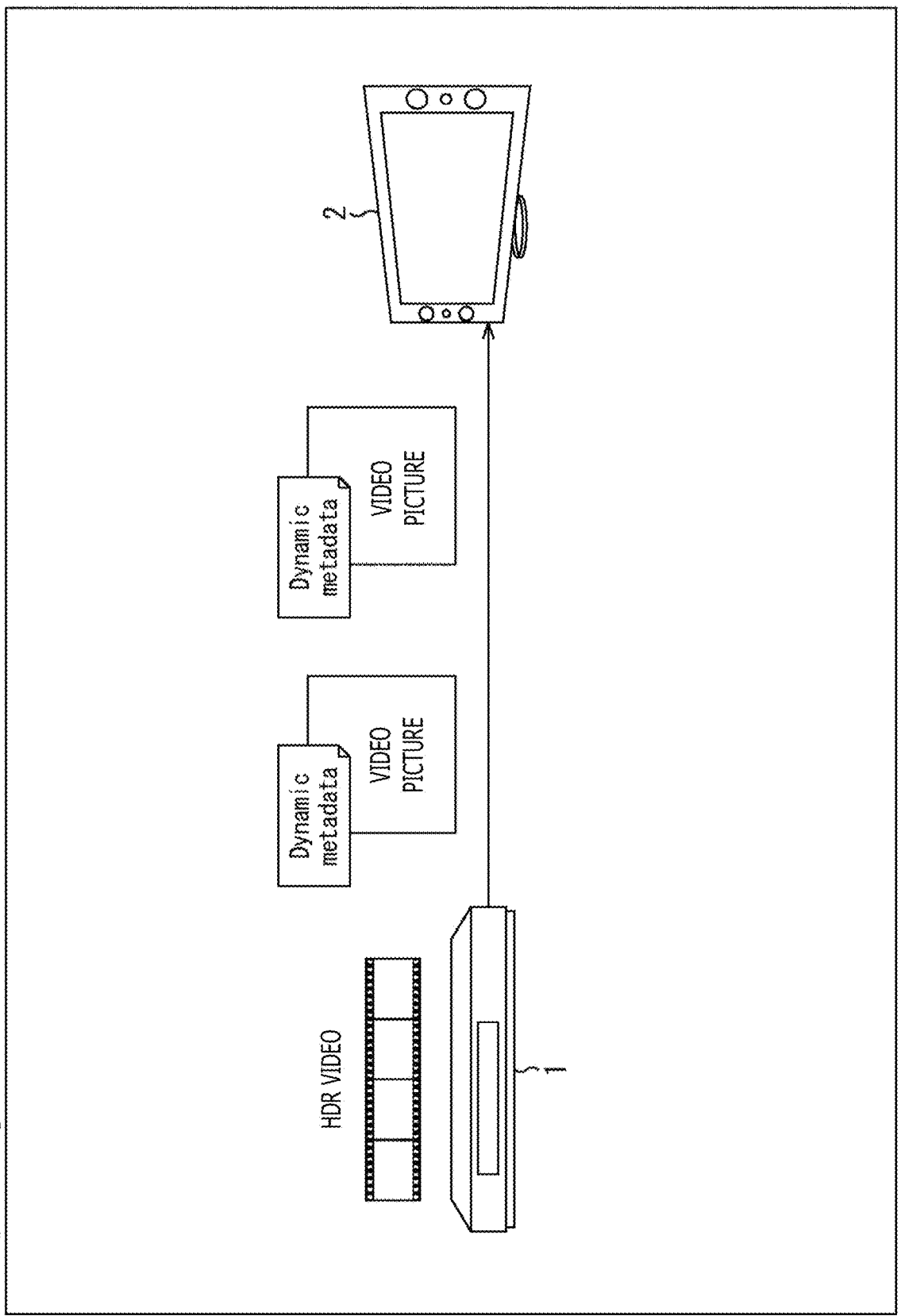
FIG. 10 is a view depicting an example of transmission of Dynamic metadata.

FIG. 10 is a view depicting an example of transmission of Dynamic metadata.

As depicted in FIG. 10, the Dynamic metadata is transmitted from the reproduction apparatus 1 to the TV 2 in an associated relation with each of pictures obtained by decoding an HDR video stream. In the TV 2, luminance compression of each picture is performed on the basis of the Dynamic metadata transmitted thereto together with the picture.

<<2. Transmission of Metadata>>

Figure 11:
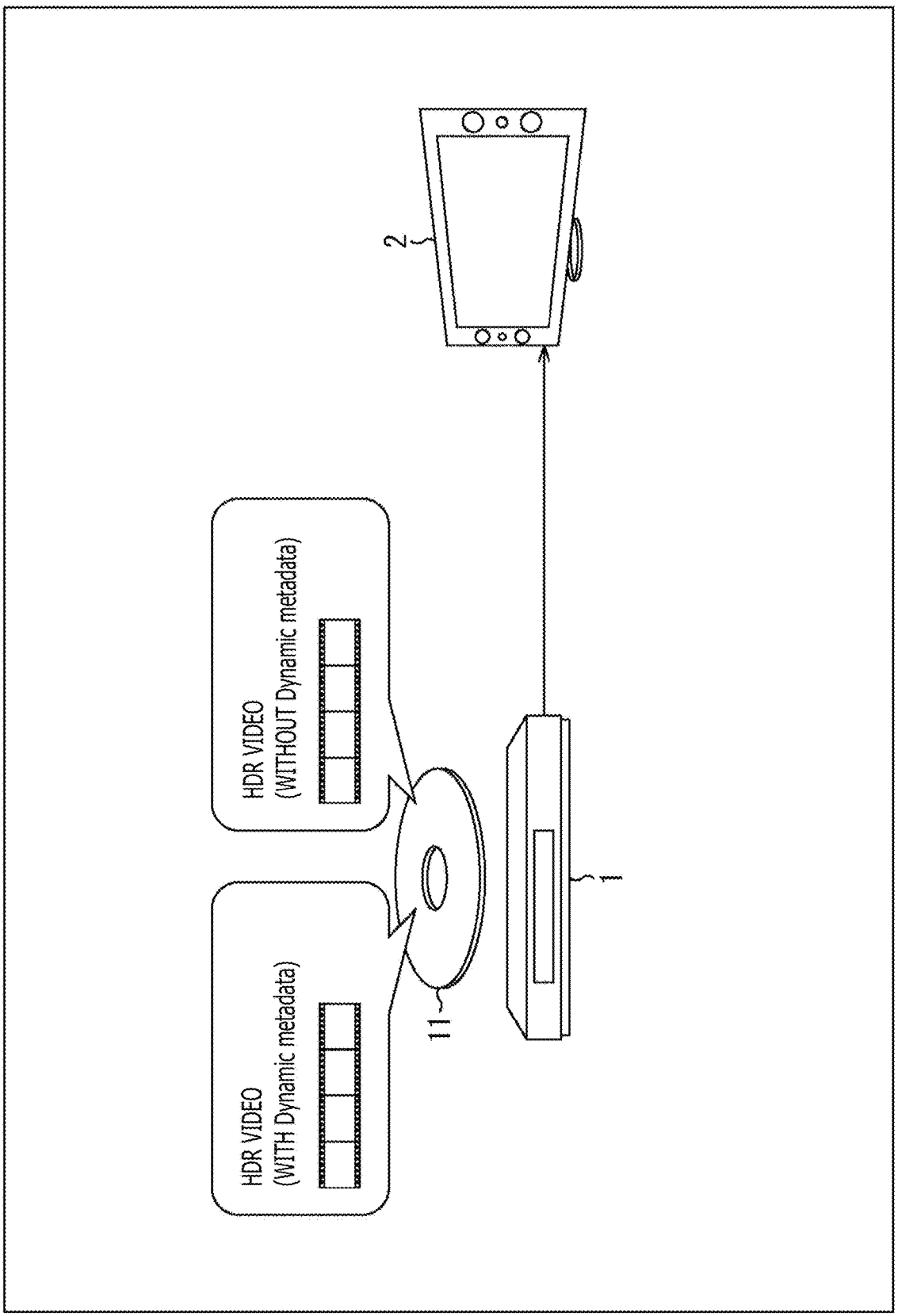
FIG. 11 is a view depicting an example of transmission of metadata by a reproduction apparatus.

FIG. 11 is a view depicting an example of transmission of metadata by the reproduction apparatus 1 according to one embodiment of the present technology.

A case is considered in which an HDR video stream to which Dynamic metadata is added and another HDR video stream to which Dynamic metadata is not added are recorded in a mixed manner on one optical disc 11 as depicted in balloons of FIG. 11. The optical disc 11 is a BD on which data is recorded, for example, in the BD-ROM format.

The HDR video stream to which Dynamic metadata is not added is a stream prepared such that Static metadata is associated therewith.

If the HDR video stream to which Dynamic metadata is added is multiplexed in the AV stream of "03000.m2ts" described hereinabove, then the HDR video stream to which Dynamic metadata is not added is multiplexed, for example, in the AV stream of "02000.m2ts." The AV stream of "01000.m2ts" is a stream in which, for example, an SDR video stream is multiplexed.

In the following description, the HDR video stream to which Dynamic metadata is added is suitably referred to as Dynamic HDR video stream, and a content including the Dynamic HDR video stream is referred to as Dynamic HDR content.

On the other hand, the HDR video stream that does not have Dynamic metadata added thereto and is prepared such that Static metadata is associated therewith is referred to Static HDR video stream, and a content including the Static HDR video stream is referred to as Static HDR content.

The reproduction apparatus 1 can reproduce not only the Dynamic HDR content but also the Static HDR content.

In a case where the Dynamic HDR content is to be reproduced, the reproduction apparatus 1 decodes the Dynamic HDR video stream and transfers Dynamic metadata to the TV 2 together with pictures as described hereinabove with reference to FIG. 10. In the TV 2, luminance compression of each picture is performed on the basis of the Dynamic metadata transmitted thereto in an associated relation with the picture.

Figure 12:
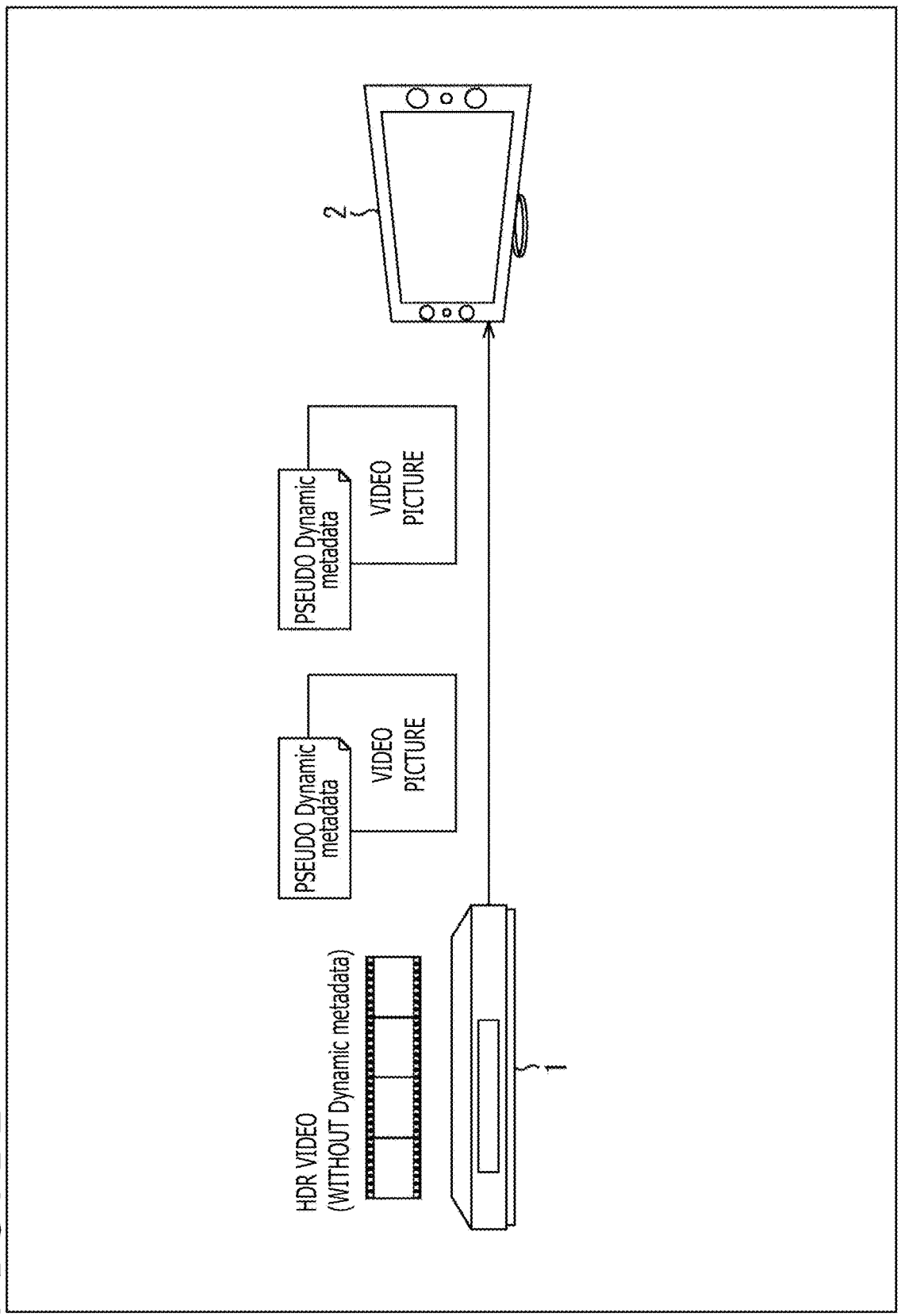
FIG. 12 is a view depicting an example of transmission of metadata in a case where a Static HDR content is to be reproduced.

FIG. 12 is a view depicting an example of transmission of metadata in a case where a Static HDR content is to be reproduced.

In the case where a Static HDR content is to be reproduced, the reproduction apparatus 1 generates Dynamic metadata including the parameters described hereinabove with reference to FIG. 6. The Dynamic metadata is generated, for example, on the basis of a description of the Static metadata or the like.

Further, the reproduction apparatus 1 decodes a Static HDR video stream and transmits generated Dynamic metadata in an associated relation with pictures obtained by the decoding to the TV 2. Since the Dynamic metadata transmitted by the reproduction apparatus 1 is not originally added to the HDR video stream (Static HDR video stream) that is a target of reproduction, it is as it were pseudo Dynamic metadata.

In the TV 2, luminance compression of each picture is performed on the basis of the pseudo Dynamic metadata transmitted thereto in an associated relation with the picture.

In the following description, Dynamic metadata generated by the reproduction apparatus 1 upon reproduction of a Static HDR content and added to and outputted together with the pictures is referred to as pseudo Dynamic metadata.

When a Dynamic HDR content and a Static HDR content are mixed in a reproducible HDR content and the static HDR content is to be reproduced in this manner, the reproduction apparatus 1 behaves as if Dynamic metadata were included in the HDR video stream. In other words, also in the case where a Static HDR content is to be reproduced, the reproduction apparatus 1 outputs Dynamic metadata (pseudo Dynamic metadata) similarly to the case of reproduction of a Dynamic HDR content.

On the other hand, the TV 2 normally operates similarly to the case of reproduction of a Dynamic HDR content.

Usually, in a case where the HDR content to be reproduced is changed over from a Dynamic HDR content to a Static HDR content or is changed over from a Static HDR content to a Dynamic HDR content, changeover of transmission setting of HDMI or of a display mode of the display occurs. Consequently, transmission of the HDR video is sometimes interrupted, resulting in momentary darkening of displaying of the display.

By performing, upon reproduction of a Static HDR content, operation similar to that upon reproduction of a Dynamic HDR content, changeover of transmission setting of HDMI or the display mode can be eliminated, resulting in prevention of darkening of display. In other words, displaying upon starting of reproduction of an HDR video stream can be stabilized.

Such a series of processes of the reproduction apparatus 1 as described above is hereinafter described with reference to a flow chart.

3. Bd Format

Here, the BD-ROM format is described.

<3-1. Management Structure of Data>

Figure 13:
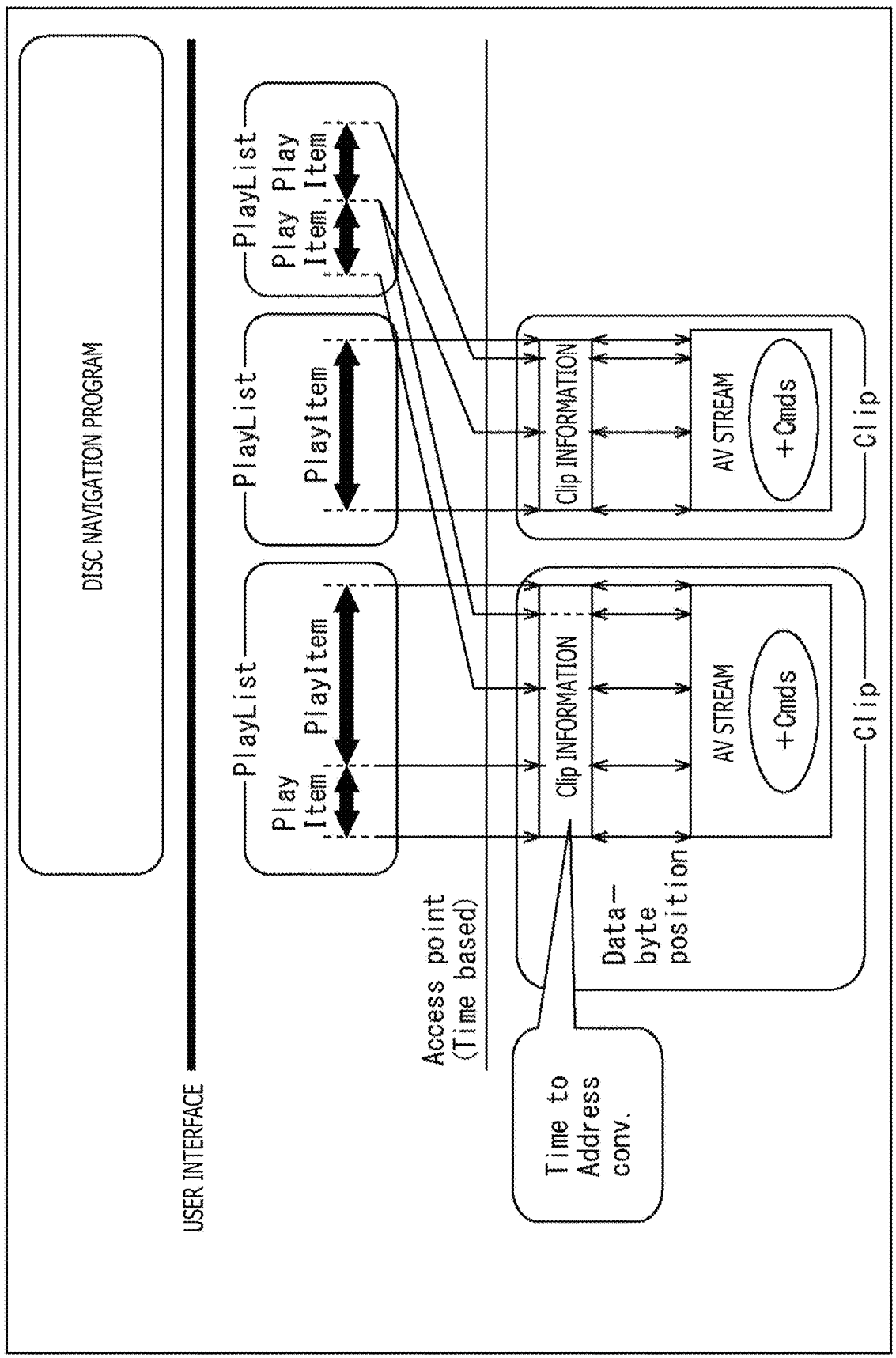
FIG. 13 is a view depicting an example of a management structure of an AV stream in a BD-ROM format.

FIG. 13 is a view depicting an example of a management structure of an AV stream in the BD-ROM format.

Management of an AV stream is performed using two layers of PlayList and Clip. An AV stream is recorded not only on an optical disc 11 but sometimes into a local storage of the reproduction apparatus 1.

One AV stream and Clip Information that is information accompanying the same are paired and managed as one object. An AV stream and Clip Information in pair are referred to as Clip.

An AV stream is deployed on the time axis, and an access point of each Clip is designated principally by a timestamp in the PlayList. The Clip Information is used for finding out an address at which decoding is to be started in the AV stream.

The Playlist is a collection of reproduction intervals of an AV stream. One reproduction interval in the AV stream is called PlayItem. The PlayItem is represented by an IN point and an OUT point in pair of a reproduction interval on the time axis. As depicted in FIG. 13, the PlayList includes one or a plurality of PlayItems.

The first PlayList from the left in FIG. 13 includes two PlayItems, and a front part and a rear part of the AV stream included in the left side Clip are referred to by the two respective PlayItems.

The second PlayList from the left includes one PlayItem, and consequently, the entire AV stream included in the right side Clip is referred to by the PlayItem.

The third PlayList from the left includes two PlayItems, and a certain portion of the AV stream included in the left side Clip and a certain portion of the AV stream included in the right side Clip are referred to by the two respective PlayItems.

For example, in a case where the left side PlayItem included in the first PlayList from the left is designated as a reproduction target by a disc navigation program, reproduction of the front part of the AV stream included in the left side Clip, which is referred to by the PlayItem, is performed.

A reproduction path including a line of one or more PlayItems in a PlayList is called Main Path. Further, a reproduction path including a line of one or more SubPlayItems in parallel to the Main Path in the PlayList is called Sub Path.

Figure 14:
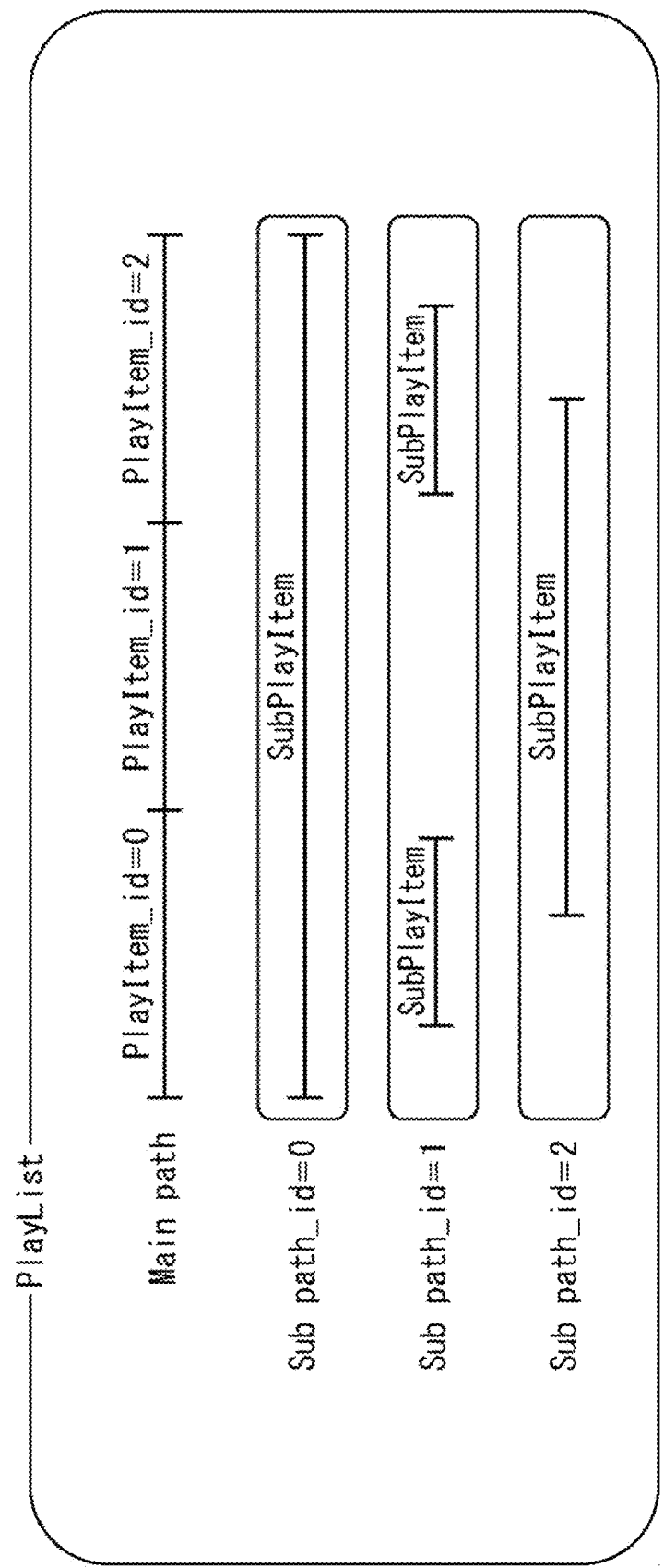
FIG. 14 is a view depicting a structure of a Main Path and a Sub Path.

FIG. 14 is a view depicting a structure of a Main Path and a Sub Path.

The PlayList has one Main Path and one or more Sub Paths. The PlayList of FIG. 14 has one Main Path including a line of three PlayItems and three Sub Paths.

To the PlayItems configuring the Main Path, IDs are individually set in order beginning with the top. Also to the Sub Paths, IDs of Subpath_id=0, Subpath_id=1, and Subpath_id=2 are set in order from the top.

In the example of FIG. 14, one SubPlayItem is included in the Sub Path of Subpath_id=0, and two SubPlayItems are included in the Sub Path of Subpath_id=1. Further, one SubPlayItem is included in the Sub Path of Subpath_id=2.

An AV stream referred to by one PlayItem includes at least a video stream. The AV stream may include or may not include one or more audio streams that are reproduced at a same timing (in synchronism) with a video stream included in the AV stream.

The AV stream may include or may not include one or more streams of subtitle data (PG (Presentation Graphic)) of a bit map that is reproduced in synchronism with the video stream included in the AV stream.

The AV stream may include or may not include one or more streams of IG (Interactive Graphic) that is reproduced in synchronism with the video stream included in the AV stream file. The stream of IG is used to display graphics of buttons or the like to be operated by a user.

In an AV stream referred to by one PlayItem, a video stream and an audio stream, a PG stream, and an IG stream that are reproduced in synchronism with the video stream are multiplexed.

Further, one SubPlayItem refers to a video stream, an audio stream, a PG stream, or the like, which is a stream different from an AV stream referred to by the PlayItem.

In this manner, reproduction of an AV stream is performed using a PlayList and Clip Information. Further, for reproduction of the AV stream, also information of an Index table hereinafter described or the like is used. The Index table, PlayList, and Clip Information that are reproduction controlling information used for managing reproduction of an AV stream as a content are suitably referred to as Data Base information.

<3-2. Directory Structure>

Figure 15:
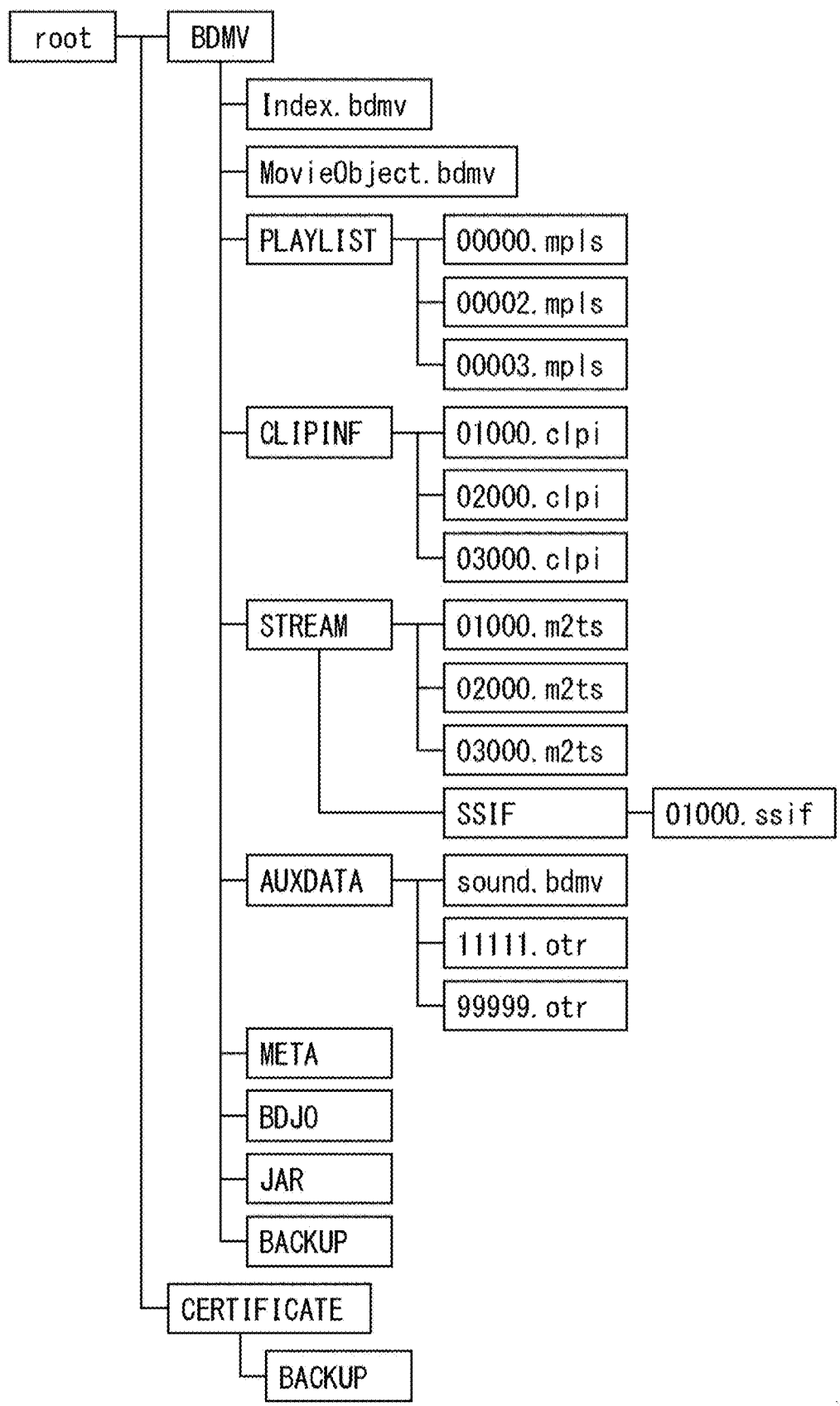
FIG. 15 is a view depicting an example of a management structure of a file.

FIG. 15 is a view depicting an example of a management structure of a file recorded on the optical disc 11.

Files recorded on the optical disc 11 are managed hierarchically by a directory structure. One root directory is created on the optical disc 11.

Under the root directory, a BDMV directory is placed.

Under the BDMV directory, an Index table file that is a file to which the name of "Index.bdmv" is set and a MovieObject file that is a file to which the name of "MovieObject.bdmv" is set are placed. An Index table is described in the Index table file.

Under the BDMV directory, a PLAYLIST directory, a CLIPINF directory, a STREAM directory, and so forth are provided.

In the PLAYLIST directory, PlayList files in each of which a PlayList is described are placed. In each PlayList file, a name which is a combination of five digits and an extension ".mpls" is set. To three PlayList files depicted in FIG. 15, file names of "00000.mpls," "00001.mpls," and "00002.mpls" are set.

In the CLIPINF directory, Clip Information files are placed. In each Clip Information file, a name which is a combination of five digits and an extension ".clpi" is set. To three Clip Information files of FIG. 15, file names of "01000.clpi," "02000.clpi," and "03000.clpi" are set.

In the STREAM directory, files of AV streams described above are placed. In each AV stream file, a name which is a combination of five digits and an extension ".m2ts" is set. To three AV stream files of FIG. 15, file names of "01000.m2ts," "02000.m2ts," and "03000.m2ts" are set.

A Clip Information file and an AV stream file in which same five digits are set as a file name are files that configure one Clip. Upon reproduction of the AV stream file of "01000.m2ts," the Clip Information file of "01000.clpi" is used, and upon reproduction of the AV stream file of "02000.m2ts," the Clip Information file of "02000.clpi" is used.

<3-3. Example of Syntax of Index Table>

FIG. 16 is a view depicting a syntax of Disc_Info( ) described in the Index table.

Disc_Info( ) is described, for example, in a region for extension of the Index table that is information relating to the entire disc. In the Disc_Info( ), length, disc_type, 4K_content_exist_flag, and HDR_content_exist_flags are described.

The length represents a length of the Disc_Info( ).

The disc_type represents a type of the disc. The type of the disc is represented by a combination of a recording capacity per one layer of the disc and a transmission rate.

The 4K_content_exist_flag is a flag indicative of whether or not a PlayList to be used for reproduction of a video of 4K resolution is stored in the disc.

The HDR_content_exist_flags is a flag representative of a type of an HDR content recorded on the disc.

FIG. 17 is a view depicting an example of setting of the HDR_content_exist_flags.

The bit 0 (LSB) of the HDR_content_exist_flags that is a flag of 16 bits indicates whether or not an SDR content is recorded. That the value of the bit 0 indicated at the right end is 1 indicates that an SDR content is recorded while that the value of the bit 0 is 0 indicates that an SDR content is not recorded.

That the value of the second bit 1 from the right is 1 indicates that a Static HDR content is recorded while that the value of the second bit 1 is 0 indicates that a Static HDR content is not recorded. The BDMV HDR content in FIG. 17 corresponds to the Static HDR content.

That the value of the third bit 2 from the right is 1 indicates that an Option HDR B content that is an HDR content of an option is recorded while that the value of the third bit 2 is 0 indicates that an Option HDR B content is not recorded.

That the value of the fourth bit 3 from the right is 1 indicates that an Option HDR A content that is an HDR content of an option is recorded while that the value of the fourth bit 3 is 0 indicates that an Option HDR A content is not recorded.

In this manner, in the BD-ROM format, a Static HDR content can be recorded as an essential HDR content while any other HDR content can be recorded as an HDR content of an option.

That the value of the fifth bit 4 from the right is 1 indicates that a Dynamic HDR content is recorded while that the value of the fifth bit 4 is 0 indicates that a Dynamic HDR content is not recorded.

The reproduction apparatus 1 can specify on the basis of the value of the bit 1 of the HDR_content_exist_flags whether or not a Static HDR content is recorded and can specify on the basis of the value of the bit 4 whether or not a Dynamic HDR content is recorded. In a case where the values of the bit 1 and the bit 4 are both set as 1, a Static HDR content and a Dynamic HDR content are recorded in a mixed state.

4. Generation Method of Pseudo Dynamic Metadata

Here, a generation method of pseudo Dynamic metadata is described. As the generation method of pseudo Dynamic metadata, a method by which pseudo Dynamic metadata is generated by the reproduction apparatus 1 itself and another method that uses data prepared on the optical disc 11 are available.

<4-1. Example of Generation by Reproduction Apparatus Itself>

(1) First generation method (example in which default value is set)

FIG. 18 is a view depicting an example of generation of pseudo Dynamic metadata for which a default value is used.

As depicted in FIG. 18, the pseudo Dynamic metadata includes parameters same as those of the Dynamic metadata described hereinabove with reference to FIG. 6.

As depicted on the right side in FIG. 18, the reproduction apparatus 1 determines the number of Windows as 1 and sets parameters relating to the Window.

The reproduction apparatus 1 sets, as the value of the Window size, a size of an HDR video (video size) and sets, as the value of the Window location, a value representative of a distance from (0, 0) to a position represented by (video width, video height). The values of the video size, the video width, and the video height are specified, for example, from Data Base information or by analyzing an HDR video stream.

Further, the reproduction apparatus 1 sets all zeros as the values of information relating to the Ellipse. The information relating to the Ellipse includes Internal Ellipse size, Internal Ellipse location, External Ellipse size, External Ellipse location, and Rotation angle.

The reproduction apparatus 1 sets 0 as the value of the Overlap process option and sets 0 as the value of the Color saturation weight.

Also in actual operation of the Dynamic metadata, values for the parameters described above are sometimes set in such a manner as described above.

The reproduction apparatus 1 sets default values as the values of the parameters of maxscl, average max rgb, Distribution max rgb percentages, Distribution max rgb percentiles, Fraction bright pixels, Knee point, and Bezier curve anchors.

The default values are stored, for example, in a memory of the reproduction apparatus 1. Minimum values of the parameters may be prepared as default values of such parameters.

The user may be permitted to set such default values. In this case, items to be selected when default values for pseudo Dynamic metadata generation are set are prepared on a menu screen image of the reproduction apparatus 1. The user would operate a remote controller or the like to set a default value to be used as a value for each parameter.

The reproduction apparatus 1 sets, as a value of the Target System display max luminance, a value representative of a maximum luminance of the display of the TV 2. The maximum luminance of the display of the TV 2 is acquired from the TV 2 upon transmission setting of HDMI.

On the other hand, the reproduction apparatus 1 does not set a value for the Local display luminance and the Local mastering display luminance in regard to the mastering display.

In this manner, it is possible for pseudo Dynamic metadata to be generated using default values prepared in advance in the reproduction apparatus 1.

(2) Second generation method (example in which pseudo Dynamic metadata is set on the basis of Static metadata)

Figure 19:
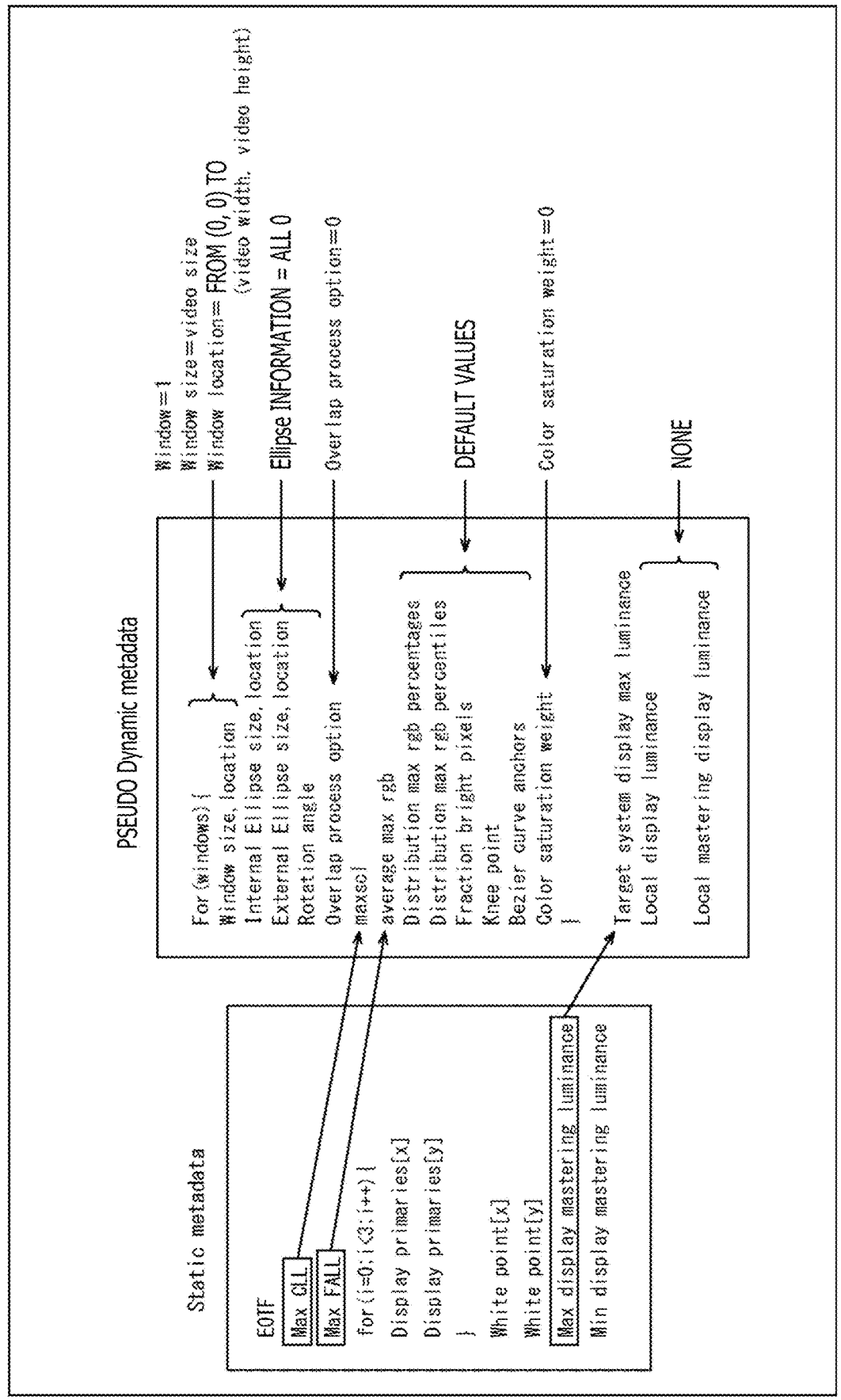
FIG. 19 is a view depicting an example of generation of pseudo Dynamic metadata for which Static metadata is used.

FIG. 19 is a view depicting an example of generation of pseudo Dynamic metadata for which Static metadata is used.

From among the parameters included in the Dynamic metadata, those parameters that are significant especially for luminance compression are the maxscl, the average max rgb, and the Target System display max luminance. The reproduction apparatus 1 sets values same as the values of the parameters included in the Static metadata to the maxscl, the average max rgb, and the Target System display max luminance.

In particular, the reproduction apparatus 1 sets, as the value of the maxscl, a value same as the value of the Max CLL of the Static metadata.

Further, the reproduction apparatus 1 sets, as the value of the average max rgb, a value same as the value of the Max FALL of the Static metadata.

The reproduction apparatus 1 sets, as the value of the Target System display max luminance, a value same as the value of the Max display mastering luminance of the Static metadata.

The reproduction apparatus 1 sets, for the other parameters of the pseudo Dynamic metadata, values by a method same as the method described above with reference to FIG. 18.

In this manner, it is possible for the pseudo Dynamic metadata to be generated using the values of the parameters included in the Static metadata.

<4-2. Example in which Data Prepared on Disc is Used>

(1) Third generation method (example in which pseudo Dynamic metadata is prepared as static data)

Figure 20:
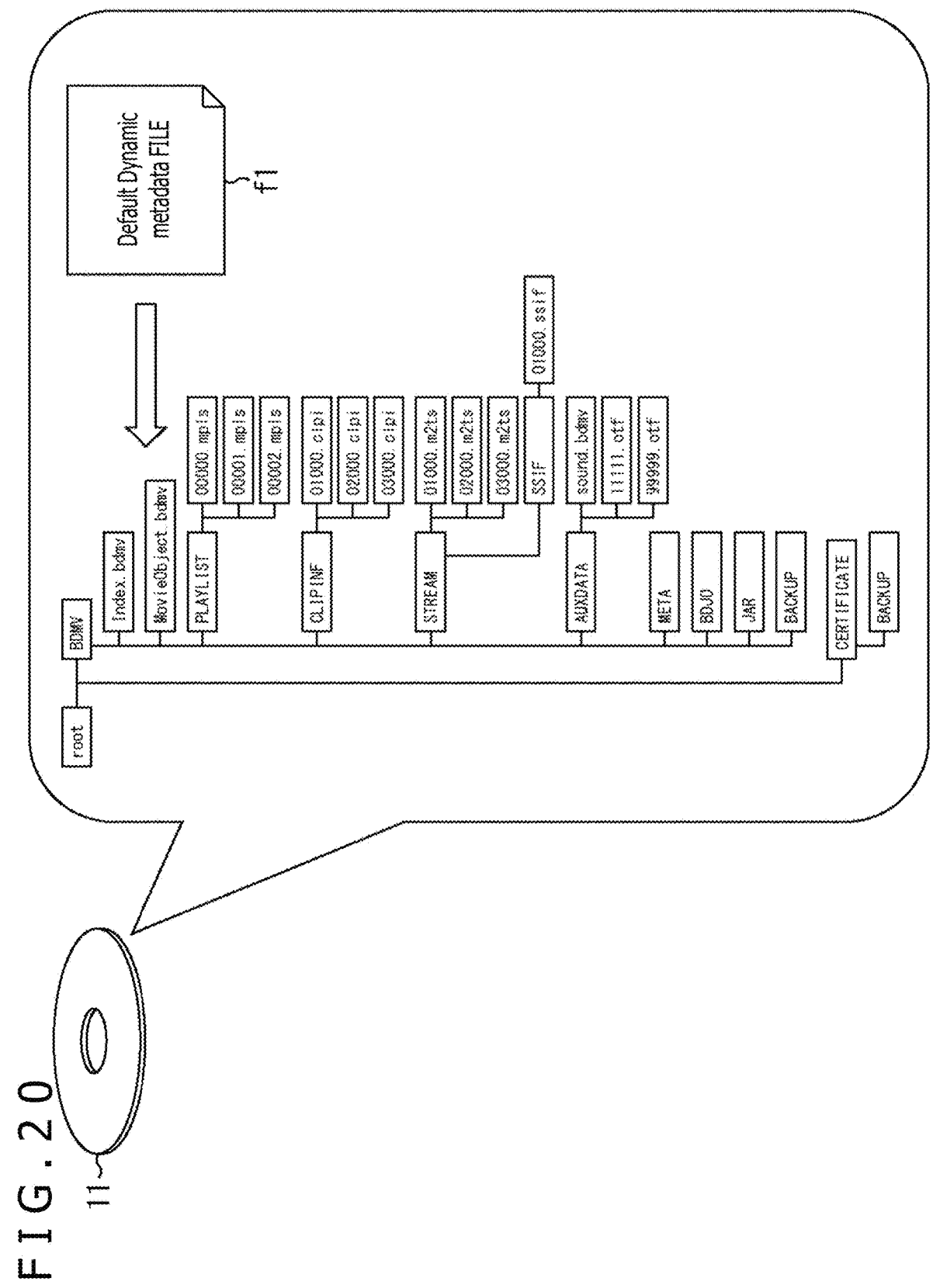
FIG. 20 is a view depicting another example of a file structure of an optical disc.

FIG. 20 is a view depicting another example of the file structure of the optical disc 11.

A Default Dynamic metadata file f1 that is a file of default pseudo Dynamic metadata may be recorded on the optical disc 11 as depicted at a right upper portion in FIG. 20. The Default Dynamic metadata file f1 is a file in which the parameters depicted in FIG. 6 are described. A predetermined value is set to each of the parameters.

In particular, in this case, the creator of the HDR contents prepares in advance the Default Dynamic metadata file f1 as data for adding upon reproduction of the Static HDR content.

Upon reproduction of the Static HDR content, the reproduction apparatus 1 reads out the Default Dynamic metadata file f1 from the optical disc 11. The reproduction apparatus 1 adds the pseudo Dynamic metadata of the Default Dynamic metadata file f1 to each picture obtained by decoding the Static HDR video stream and transmits resulting data.

A file of the pseudo Dynamic metadata may not be prepared, but values of the parameters of the pseudo Dynamic metadata may be described in a predetermined field of the Data Base information. In this case, the reproduction apparatus 1 generates pseudo Dynamic metadata by setting values specified by analyzing the Data Base information to the parameters.

(2) Fourth generation method (example in which pseudo Dynamic metadata is prepared as dynamic data)

A program of Java (registered trademark) for pseudo Dynamic metadata generation (BD-J program) may be prepared on the optical disc 11.

In the file structure of the optical disc 11, under the BDMV directory, a JAR file that is a file of a BD-J program is placed (FIG. 15). The reproduction apparatus 1 reads out the JAR file from the optical disc 11 and executes the program for the pseudo Dynamic metadata generation to generate pseudo Dynamic metadata.

FIGS. 21 to 23 are views depicting examples of classes of the API (Application Programming Interface) of BD-J. The classes depicted in FIGS. 21 to 23 are defined newly in order to use them in the program for pseudo Dynamic metadata generation.

FIG. 21 is a view depicting an org.blurayx.uhd.hdr.DynamicHDRMetadataControl class.

The org.blurayx.uhd.hdr.DynamicHDRMetadataControl class is a class for setting values to the parameters of the pseudo Dynamic metadata.

As a method of the org.blurayx.uhd.DynamicHDRMetadataControl class, two methods including a setter method for setting values in a memory region and a getter method for acquiring set values depicted in FIG. 21 are defined.

FIG. 22 is a view depicting an org.blurayx.uhd.hdr.DynamicHDRMetadata class.

The org.blurayx.uhd.hdr.DynamicHDRMetadata class is a class for designating DynamicHDRMetadata.

As a method of the org.blurayx.uhd.hdr.DynamicHDRMetadata class, nine methods depicted in FIG. 22 are defined.

org.blurayx.uhd.hdr.DynamicHDRMetadata#createInstance( ) in the first row is a method for reserving a memory.

org.blurayx.uhd.hdr.DynamicHDRMetadata#setWindow (Window window, int window_number) in the second row and org.blurayx.uhd.hdr.DynamicHDRMetadata#getWindow (int window_number) in the third row are methods for setting the number of Windows.

org.blurayx.uhd.hdr.DynamicHDRMetadata#setTargetDisplayLuminance (int maxLuminance) in the fourth row and org.blurayx.uhd.hdr.DynamicHDRMetadata#getTargetDisplayLuminance ( ) in the fifth row are methods for setting a value of the Target System display max luminance.

org.blurayx.uhd.hdr.DynamicHDRMetadata#setLocal- DisplayLuminance (int[ ] [ ] luminances) in the sixth row and org.blurayx.uhd.hdr.DynamicHDRMetadata#getLocal- DisplayLuminance ( ) in the seventh row are methods for setting a value of the Local display luminance.

org.blurayx.uhd.hdr.DynamicHDRMetadata#setLocalMasteringDisplayLuminance (int[ ][ ] luminances) in the eighth row and org.blurayx.uhd.hdr.DynamicHDRMetadata#getLocalMasteringDisplayLuminance ( ) in the ninth row are methods for setting a value of the Local mastering display luminance.

FIG. 23 is a view depicting an org.blurayx.uhd.hdr.Window class.

The org.blurayx.uhd.hdr.Window class is a class for designating a Window.

As a method for the org.blurayx.uhd.hdr.Window class, 26 methods depicted in FIG. 23 are defined.

org.blurayx.uhd.hdr.Window#createInstance( ) in the first row is a method for reserving a memory.

org.blurayx.uhd.hdr.Window#setLocation(java.awt.Rectangle location) in the second row and org.blurayx.uhd.hdr.Window#getLocation( ) in the third row are methods for setting a value for the Window location.

org.blurayx.uhd.hdr.Window#setInternalEllipse(java.awt.Rectangle location, int angle) in the fourth row, org.blurayx.uhd.hdr.Window#getInternalEllipseSize( ) in the fifth row, and org.blurayx.uhd.hdr.Window#getInternalEllipseAngle( ) in the sixth row are methods for setting values for the Internal Ellipse size and the Internal Ellipse location.

org.blurayx.uhd.hdr.Window#setExternalEllipse(java.awt.Rectangle location, int angle) in the seventh row, org.blurayx.uhd.hdr.Window#getExternalEllipseSize( ) in the eighth row, and org.blurayx.uhd.hdr.Window#getExternalEllipseAngle( ) in the ninth row are methods for setting values for the External Ellipse size and the External Ellipse location.

org.blurayx.uhd.hdr.Window#setOverlapProcess(int process) in the tenth row and org.blurayx.uhd.hdr.Window#getOverlapProcess( ) in the 11th row are methods for setting a value for the Overlap process option.

org.blurayx.uhd.hdr.Window#setMaxSCL(int MaxSCL) in the 12th row and org.blurayx.uhd.hdr.Window#getMaxSCL( ) in the 13th row are methods for setting a value for the maxscl.

org.blurayx.uhd.hdr.Window#setAverageMaxRGB(intaverageMaxRGB) in the 14th row and org.blurayx.uhd.hdr.Window#getAverageMaxRGB( ) in the 15th row are methods for setting a value for the average max rgb.

org.blurayx.uhd.hdr.Window#setDistributionMaxRGB (int[ ][ ] values) in the 16th row and org.blurayx.uhd.hdr.Window#getDistributionMaxRGB( ) in the 17th row are methods for setting values for the Distribution max rgb percentages and the Distribution max rgb percentiles.

org.blurayx.uhd.hdr.Window#setFractionBrightPixels(int values) in the 18th row and org.blurayx.uhd.hdr.Window#getFractionBrightPixels( ) in the 19th row are methods for setting a value for the Fraction bright pixels.

org.blurayx.uhd.hdr.Window#setKneePoint(int x, int y) in the 20th row, org.blurayx.uhd.hdr.Window#getKneePointx( ) in the 21st row, and org.blurayx.uhd.hdr.Window#getKneePointy( ) in the 22nd row are methods for setting a value for the Knee point.

org.blurayx.uhd.hdr.Window#setBezierCurveAnchors(int[ ] anchors) in the 23rd row and org.blurayx.uhd.hdr.Window#getBezierCurveAnchors( ) in the 24th row are methods for setting a value for the Bezier curve anchors.

org.blurayx.uhd.hdr.Window#setColorSaturationWeight(int weight) in the 25th row and org.blurayx.uhd.hdr.Window#getColorSaturationWeight( ) in the 26th row are methods for setting a value for the Color saturation weight.

The reproduction apparatus 1 generates pseudo Dynamic metadata by executing the BD-J program using the classes described above.

In this manner, as a method for generating pseudo Dynamic metadata, various methods can be used.

5. Configuration and Operation of Reproduction Apparatus

<5-1. Configuration of Reproduction Apparatus>

Here, a configuration of the reproduction apparatus 1 that reproduces an HDR content in such a manner as described above is described.

FIG. 24 is a block diagram depicting a configuration example of the reproduction apparatus 1.

The reproduction apparatus 1 includes a controller 51, a disc drive 52, a memory 53, a local storage 54, a communication section 55, a decoding processing section 56, an operation inputting section 57, and an external outputting section 58.

The controller 51 includes a CPU (Central Processing Unit), a ROM (Read Only Memory), a RAM (Random Access Memory), and so forth. The controller 51 executes a predetermined program to control operation of the entire reproduction apparatus 1.

The disc drive 52 reads out data recorded on the optical disc 11 and outputs the data to the controller 51, the memory 53, or the decoding processing section 56. For example, the disc drive 52 outputs Data Base information read out from the optical disc 11 to the controller 51 and outputs an AV stream to the decoding processing section 56.

The memory 53 stores data necessary for the controller 51 to execute various processes of a program or the like to be executed by the controller 51.

The local storage 54 includes a recording medium such as an HDD (Hard Disk Drive) or an SSD (Solid State Drive). Into the local storage 54, a stream downloaded from a server and so forth are recorded.

The communication section 55 is an interface of a wireless LAN or a wired LAN. For example, the communication section 55 performs communication with a server through a network such as the Internet and supplies data downloaded from the server to the local storage 54.

The decoding processing section 56 decodes an HDR video stream multiplexed in an AV stream supplied from the disc drive 52 and outputs data of an HDR video obtained by the decoding to the external outputting section 58.

Further, the decoding processing section 56 decodes an audio stream multiplexed in the AV stream and outputs audio data obtained by the decoding to the external outputting section 58. Although description is given principally of reproduction of a video, an HDR content reproduced by the reproduction apparatus 1 includes also audio data in this manner.

The operation inputting section 57 includes an inputting device such as buttons or a touch panel, and a reception section that receives a signal of infrared rays or the like transmitted from a remote controller. The operation inputting section 57 detects an operation of a user and supplies a signal representative of the substance of the detected operation to the controller 51.

The external outputting section 58 is an interface for external outputting of HDMI or the like. The external outputting section 58 communicates with the TV 2 through an HDMI cable, and acquires information regarding the performance of the display the TV 2 has and outputs the information to the controller 51. Further, the external outputting section 58 outputs data of an HDR video supplied from the decoding processing section 56 to the TV 2.

Figure 25:
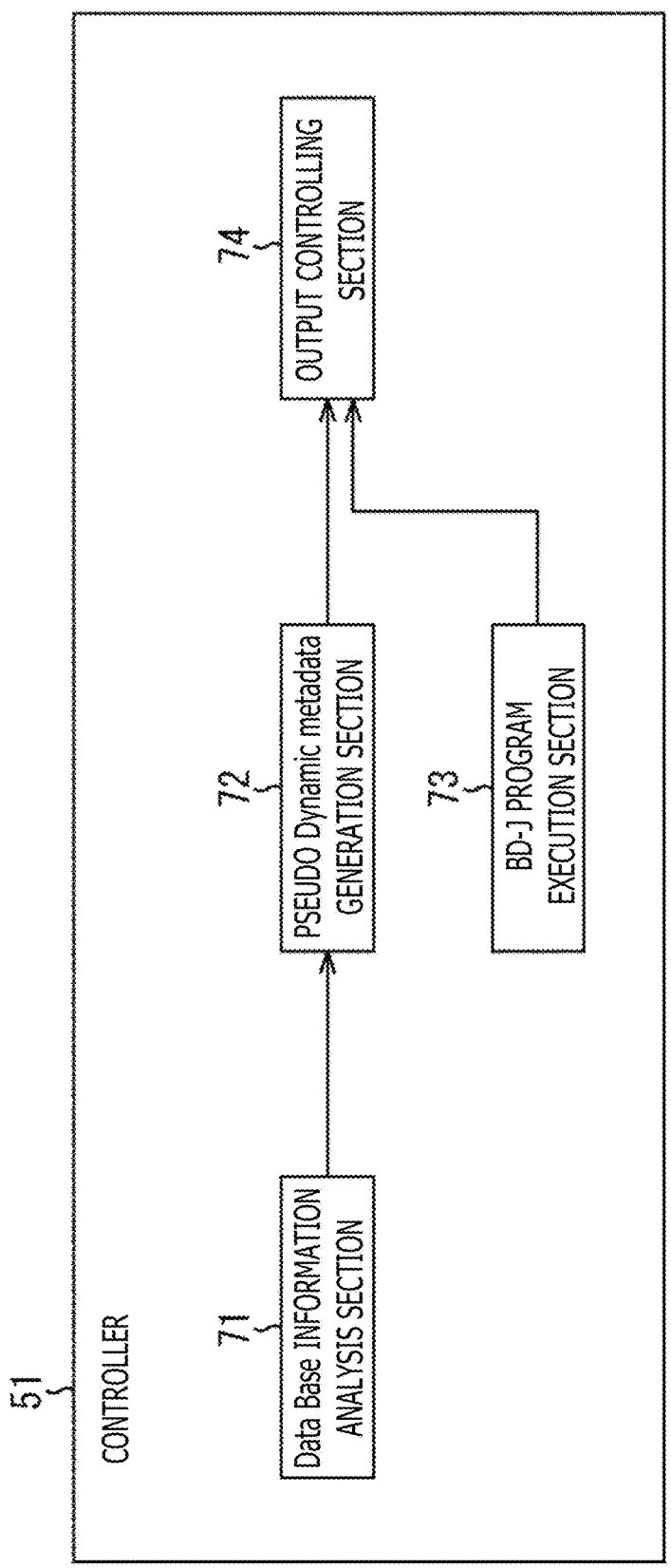
FIG. 25 is a block diagram depicting a functional configuration example of a controller of FIG. 24.

FIG. 25 is a block diagram depicting a functional configuration example of the controller 51.

In the controller 51, a Data Base information analysis section 71, a pseudo Dynamic metadata generation section 72, a BD-J program execution section 73, and an output controlling section 74 are implemented. At least part of the functioning sections depicted in FIG. 25 is implemented by execution of a predetermined program by the CPU of the controller 51.

The Data Base information analysis section 71 analyzes Data Base information supplied from the disc drive 52.

For example, the Data Base information analysis section 71 analyzes the Index table and specifies the type of an HDR content recorded on the optical disc 11 on the basis of the HDR_content_exist_flags. The Data Base information analysis section 71 outputs information representative of the type of the HDR content recorded on the optical disc 11 to the pseudo Dynamic metadata generation section 72.

In the case where a Dynamic HDR content and a Static HDR content are recorded in a mixed manner on the optical disc 11 and the Static HDR content is to be reproduced, the pseudo Dynamic metadata generation section 72 generates pseudo Dynamic metadata. That a Dynamic HDR content and a Static HDR content are recorded in a mixed manner on the optical disc 11 is specified by the Data Base information analysis section 71 on the basis of the HDR_content_exist_flags.

For example, in the case where pseudo Dynamic metadata is generated by the first generation method, the pseudo Dynamic metadata generation section 72 generates pseudo Dynamic metadata by setting the default values as the values for the parameters as described hereinabove with reference to FIG. 18. The default values to be used for generation of pseudo Dynamic metadata are stored, for example, in the memory 53.

On the other hand, in the case where pseudo Dynamic metadata is to be generated by the second generation method, the pseudo Dynamic metadata generation section 72 generates pseudo Dynamic metadata using values of predetermined parameters included in the Static metadata and the default values as described hereinabove with reference to FIG. 19. The Static metadata to be used for generation of pseudo Dynamic metadata is obtained by the Data Base information analysis section 71 by analyzing the PlayList.

In the case where pseudo Dynamic metadata is generated by the third generation method, the pseudo Dynamic metadata generation section 72 generates metadata recorded in the Default Dynamic metadata file f1 as pseudo Dynamic metadata as described hereinabove with reference to FIG. 20. In the case where pseudo Dynamic metadata is generated by the third generation method, the Default Dynamic metadata file f1 read out from the optical disc 11 is supplied to the controller 51.

The pseudo Dynamic metadata generation section 72 outputs the generated pseudo Dynamic metadata to the output controlling section 74.

The BD-J program execution section 73 executes the BD-J program recorded on the optical disc 11.

For example, in the case where a Dynamic HDR content and a Static HDR content are recorded in a mixed manner on the optical disc 11 and the Static HDR content is to be reproduced, the BD-J program execution section 73 executes the program for pseudo Dynamic metadata generation recorded on the optical disc 11. The BD-J program execution section 73 outputs the pseudo Dynamic metadata generated by executing the program for the pseudo Dynamic metadata generation to the output controlling section 74.

The generation of pseudo Dynamic metadata by the BD-J program execution section 73 is performed in the case where pseudo Dynamic metadata is to be generated by the fourth generation method. In the case where pseudo Dynamic metadata is to be generated by the fourth generation method, the BD-J program execution section 73 functions as a generation section for generating pseudo Dynamic metadata.

The output controlling section 74 controls outputting of an HDR content by controlling the decoding processing section 56 and the external outputting section 58.

For example, in the case where a Dynamic HDR content and a Static HDR content are recorded in a mixed manner on the optical disc 11 and the Dynamic HDR content is to be reproduced, the output controlling section 74 controls the decoding processing section 56 to decode the Dynamic HDR video stream. Further, the output controlling section 74 controls the external outputting section 58 to add Dynamic metadata to pictures obtained by decoding the Dynamic HDR video stream and output the resulting pictures.

In the case where a Dynamic HDR content and a Static HDR content are recorded in a mixed manner on the optical disc 11 and the Static HDR content is to be reproduced, the output controlling section 74 controls the decoding processing section 56 to decode the Static HDR video stream. Further, the output controlling section 74 controls the external outputting section 58 to add the pseudo Dynamic metadata supplied from the pseudo Dynamic metadata generation section 72 or the BD-J program execution section 73 to the pictures obtained by decoding the Static HDR video stream and output the resulting pictures.

<5-2. Operation of Reproduction Apparatus>

Figure 26:
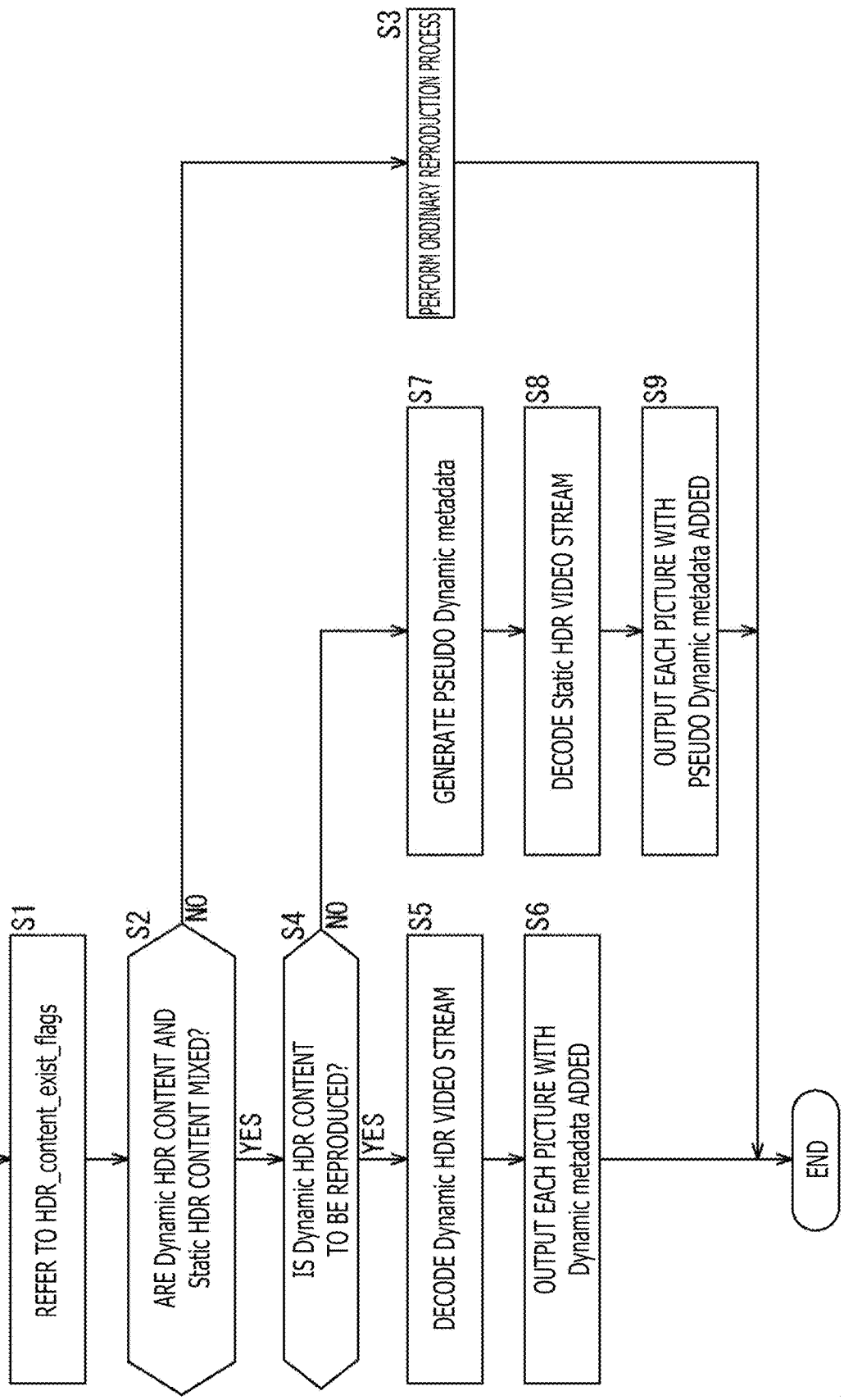
FIG. 26 is a flow chart illustrating a reproduction process of the reproduction apparatus.

Now, a process of the reproduction apparatus 1 for reproducing an HDR content is described with reference to a flow chart of FIG. 26. The process of FIG. 26 is started, for example, when the optical disc 11 is loaded into the disc drive 52 of the reproduction apparatus 1.

At step S1, the Data Base information analysis section 71 controls the disc drive 52 to read out the Index table file and refers to the HDR_content_exist_flags of the Index table. The Data Base information analysis section 71 specifies the type of the HDR content recorded on the optical disc 11 on the basis of the value of the HDR_content_exist_flags.

At step S2, the Data Base information analysis section 71 decides whether or not a Dynamic HDR content and a Static HDR content are recorded in a mixed manner on the optical disc 11.

In a case where it is decided at step S2 that a Dynamic HDR content and a Static HDR content are not recorded in a mixed manner on the optical disc 11, namely, that a Dynamic HDR content or a Static HDR content is recorded, the process advances to step S3.

At step S3, an ordinary reproduction process is performed.

For example, in a case where it is instructed to reproduce a Dynamic HDR content recorded on the optical disc 11, the disc drive 52 reads out Data Base information to be used for reproduction of the Dynamic HDR content from the optical disc 11 and outputs the Data Base information to the controller 51. Further, the disc drive 52 reads out an AV stream file from the optical disc 11 and outputs the AV stream file to the decoding processing section 56.

The decoding processing section 56 separates and decodes the Dynamic HDR video stream from the AV stream supplied from the disc drive 52 and outputs data of pictures to the external outputting section 58. The Dynamic metadata included in the Dynamic HDR video stream is supplied to the controller 51.

The external outputting section 58 adds the Dynamic metadata, supplied from the controller 51, to the pictures of the Dynamic HDR content supplied from the decoding processing section 56 and outputs the resulting pictures to the TV 2.

On the other hand, in a case where it is instructed to reproduce a Static HDR content recorded on the optical disc 11, the disc drive 52 reads out the Data Base information to be used for reproduction of the Static HDR content from the optical disc 11 and supplies the Data Base information to the controller 51. Further, the disc drive 52 reads out and outputs an AV stream file from the optical disc 11 to the decoding processing section 56.

The Data Base information analysis section 71 of the controller 51 acquires Static metadata by analyzing the PlayList. The Static metadata acquired by the Data Base information analysis section 71 is outputted from the external outputting section 58 to the TV 2 under the control of the output controlling section 74. The transmission of the Static metadata is performed before transmission of data of Static HDR video as described hereinabove.

The decoding processing section 56 separates and decodes a Static HDR video stream from the AV stream supplied from the disc drive 52 and outputs data of pictures to the external outputting section 58. The external outputting section 58 outputs pictures of the Static HDR content supplied from the decoding processing section 56 to the TV 2.

In the TV 2, luminance compression of the pictures of the Dynamic HDR content supplied from the reproduction apparatus 1 is performed on the basis of the Dynamic metadata and display of the HDR video is performed. Further, luminance compression of pictures of the Static HDR content supplied from the reproduction apparatus 1 is performed on the basis of the Static metadata and display of the HDR video is performed.

An ordinary reproduction process in the case where a Dynamic HDR content or a Static HDR content is recorded on the optical disc 11 is performed in such a manner as described above.

On the other hand, in a case where it is decided at step S2 that a Dynamic HDR content and a Static HDR content are recorded in a mixed manner on the optical disc 11, the process advances to step S4.

At step S4, the controller 51 decides whether or not reproduction of the Dynamic HDR content is to be performed.

In a case where it is decided at step S4 that reproduction of the Dynamic HDR content is to be performed, a process same as that upon ordinary reproduction of a Dynamic HDR content is performed.

In particular, at step S5, the decoding processing section 56 decodes a Dynamic HDR video stream separated from an AV stream read out by the disc drive 52 and outputs data of pictures to the external outputting section 58. Further, the decoding processing section 56 outputs Dynamic metadata included in the Dynamic HDR video stream to the controller 51.

At step S6, the external outputting section 58 adds the Dynamic metadata, supplied from the controller 51, to the pictures obtained by decoding the Dynamic HDR video stream and outputs the resulting pictures.

On the other hand, in a case where it is decided at step S4 that reproduction of the Static HDR content is to be performed, the process advances to step S7.

At step S7, the controller 51 generates pseudo Dynamic metadata by any one of the first to fourth generation methods described hereinabove.

At step S8, the decoding processing section 56 decodes the Static HDR video stream separated from the AV stream read out by the disc drive 52 and outputs data of pictures to the external outputting section 58.

At step S9, the external outputting section 58 adds the pseudo Dynamic metadata, supplied from the controller 51, to the pictures obtained by decoding the Static HDR video stream and outputs the resulting pictures.

By the processes described above, even in the case where a Dynamic HDR content and a Static HDR content are recorded in a mixed manner on the optical disc 11 and the Static HDR content is to be reproduced, the reproduction apparatus 1 can transmit metadata similar to Dynamic metadata to the TV 2.

By transmitting metadata similar to Dynamic metadata, even in the case where the reproduction target is changed over between a Dynamic HDR content and a Static HDR content, darkening of display can be prevented.

It is to be noted that, in the case where a Dynamic HDR content and a Static HDR content are recorded in a mixed manner on the optical disc 11, every time the HDR content that is made a reproduction target is changed over, the processes at the steps beginning with step S4 are performed.

For example, in a case where the HDR content that is made a reproduction target is changed over to a Dynamic HDR content after reproduction of a Static HDR content is performed by the processes at steps S7 to S9, the processes at steps S5 and S6 are performed. In this case, generation of pseudo Dynamic metadata is not performed, and Dynamic metadata included in the Dynamic HDR video stream is added to pictures obtained by decoding the Dynamic HDR video stream and the resulting pictures are outputted to the TV 2.

6. Configuration and Operation of Other Apparatuses

<6-1. Configuration and Operation of TV 2>

Figure 27:
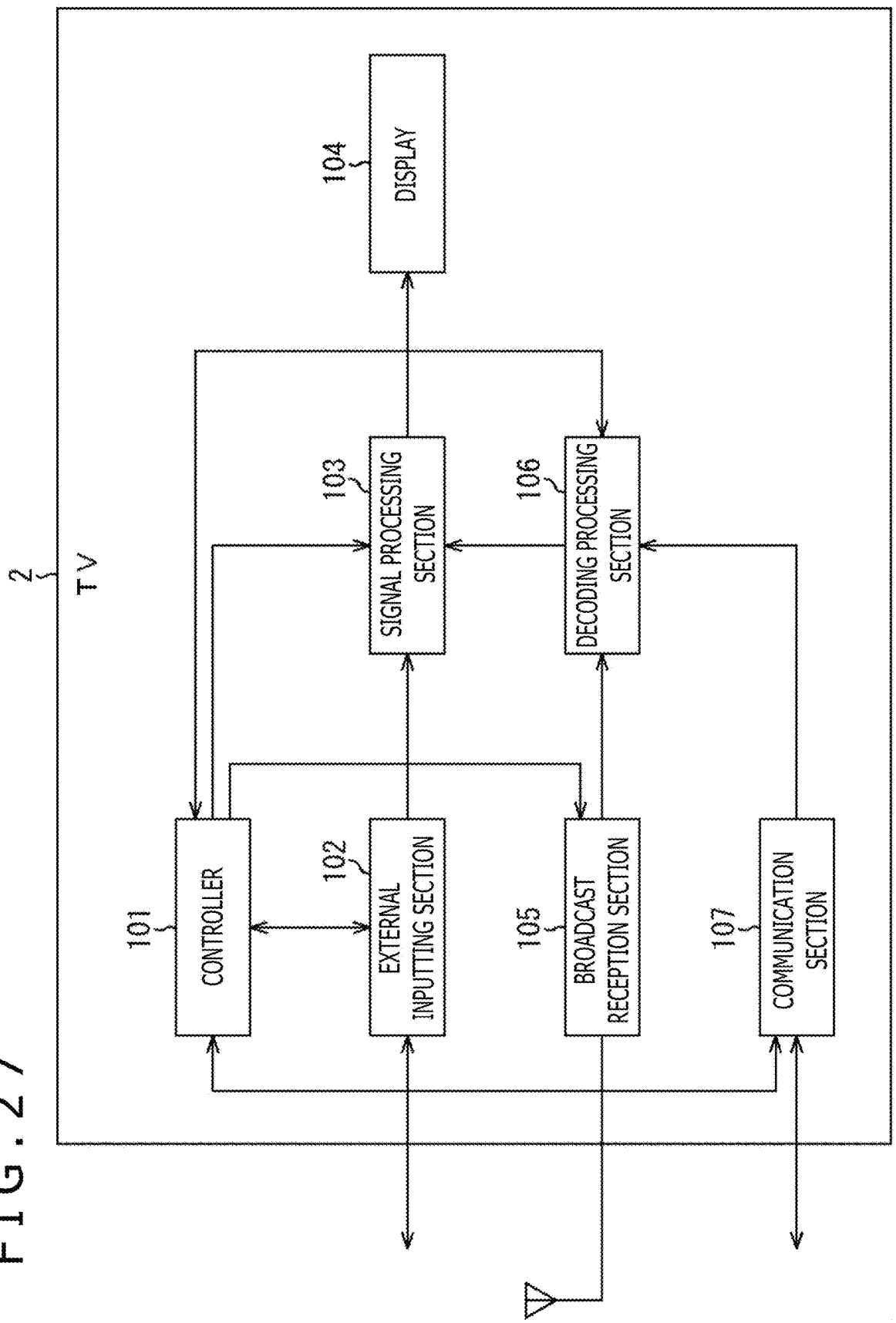
FIG. 27 is a block diagram depicting a configuration example of a TV.

FIG. 27 is a block diagram depicting a configuration example of the TV 2.

The TV 2 includes a controller 101, an external inputting section 102, a signal processing section 103, a display 104, a broadcast reception section 105, a decoding processing section 106, and a communication section 107.

The controller 101 includes a CPU, a ROM, a RAM, and so forth. The controller 101 executes a predetermined program and controls operation of the entire TV 2.

For example, the controller 101 manages information representative of performances of the display 104. Upon transmission setting of HDMI, the controller 101 outputs information representative of the performances of the display 104 to the external inputting section 102 so as to be transmitted to the reproduction apparatus 1.

Further, the controller 101 controls a process of an HDR video by the signal processing section 103. For example, the controller 101 controls the signal processing section 103 to perform luminance compression of pictures of a Dynamic HDR content on the basis of Dynamic metadata transmitted thereto from the reproduction apparatus 1 upon reproduction of the Dynamic HDR content. Further, the controller 101 controls the signal processing section 103 to perform luminance compression of pictures of a Static HDR content on the basis of the pseudo Dynamic metadata transmitted thereto from the reproduction apparatus 1 upon reproduction of the Static HDR content.

The external inputting section 102 is an interface for an external input of HDMI or the like. The external inputting section 102 communicates with the reproduction apparatus 1 through an HDMI cable, and receives data of pictures of an HDR video transmitted thereto from the reproduction apparatus 1 and then outputs the data to the signal processing section 103. Further, the external inputting section 102 receives Dynamic metadata or pseudo Dynamic metadata added to and transmitted together with the pictures of the HDR video and outputs the Dynamic metadata or pseudo Dynamic metadata to the controller 101.

The signal processing section 103 performs a process for the HDR video supplied thereto from the external inputting section 102 and causes an image to be displayed on the display 104. The signal processing section 103 performs luminance compression of the HDR video under the control of the controller 101 such that the HDR video may be included in a range capable of being displayed by the display 104.

The signal processing section 103 performs also a process for causing the display 104 to display an image of a program on the basis of data supplied thereto from the decoding processing section 106.

The display 104 is a display device such as an organic EL (Electroluminescence) display or an LCD (Liquid Crystal Display). The display 104 displays an image of an HDR content or an image of a program on the basis of a video signal supplied from the signal processing section 103.

The broadcast reception section 105 extracts a broadcasting signal of a predetermined channel from a signal supplied from an antenna and outputs the broadcasting signal to the decoding processing section 106. The extraction of a broadcasting signal by the broadcast reception section 105 is performed under the control of the controller 101.

The decoding processing section 106 performs a process such as decoding for a broadcasting signal supplied from the broadcast reception section 105 and outputs video data of a program to the signal processing section 103.

The communication section 107 is an interface for a wireless LAN, a wired LAN, or the like. The communication section 107 performs communication with a server through the Internet.

Figure 28:
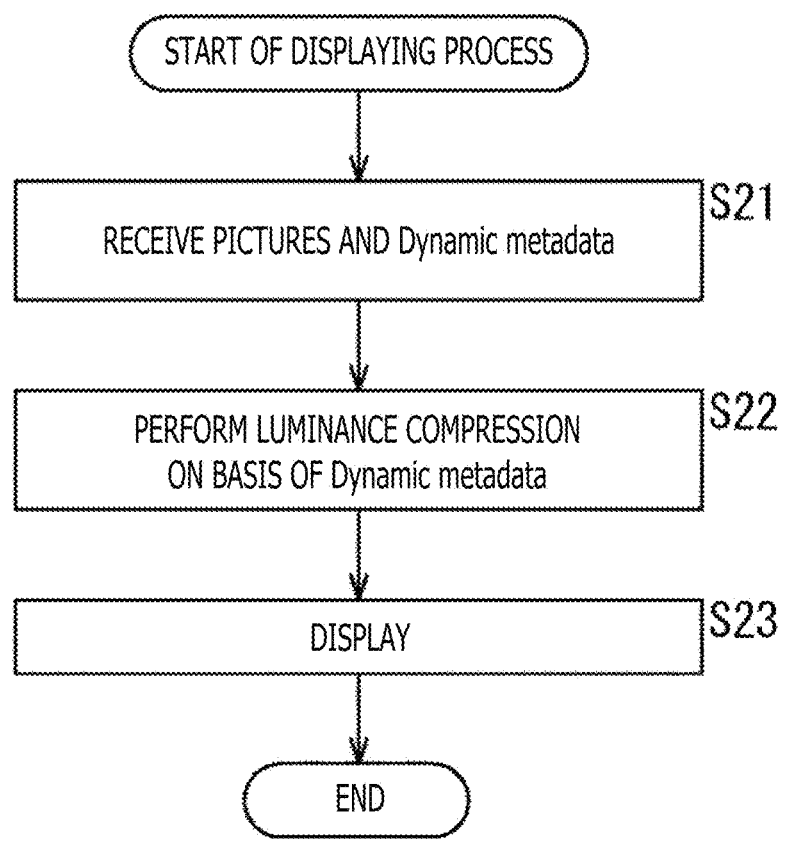
FIG. 28 is a flow chart illustrating a displaying process of the TV.

A displaying process of the TV 2 is described with reference to a flow chart of FIG. 28.

Here, it is assumed that a Dynamic HDR content and a Static HDR content are recorded in a mixed manner on the optical disc 11. The process of FIG. 28 is performed when transmission of a picture obtained by decoding a Dynamic HDR video stream or a Static HDR video stream is started.

At step S21, the external inputting section 102 of the TV 2 receives data of pictures of an HDR content transmitted from the reproduction apparatus 1 and Dynamic metadata added to and transmitted together with the data (Dynamic metadata transmitted in an associated relation).

In a case where the HDR content whose reproduction is being performed by the reproduction apparatus 1 is a Dynamic HDR content, here the pictures obtained by decoding the Dynamic HDR video stream and the Dynamic metadata added to and transmitted together with them are received.

On the other hand, in a case where the HDR content whose reproduction is being performed by the reproduction apparatus 1 is a Static HDR content, here the pictures obtained by decoding the Static HDR video stream and pseudo Dynamic metadata added to and transmitted together with them are received.

In this manner, irrespective of whether the HDR content whose reproduction is being performed by the reproduction apparatus 1 is a Dynamic HDR content or a Static HDR content, the process performed by the TV 2 is the same process although the substance of the data is different.

The data of the pictures received by the external inputting section 102 are supplied to the signal processing section 103, and the metadata (Dynamic metadata or pseudo Dynamic metadata) is supplied to the controller 101.

At step S22, the signal processing section 103 performs luminance compression of the pictures of the HDR video on the basis of the Dynamic metadata under the control of the controller 101.

Here, in the case where the HDR content whose reproduction is being performed by the reproduction apparatus 1 is a Dynamic HDR content, luminance compression of the pictures is performed on the basis of the Dynamic metadata. On the other hand, in the case where the HDR content whose reproduction is being performed by the reproduction apparatus 1 is a Static HDR content, luminance compression of the pictures is performed on the basis of the pseudo Dynamic metadata.

At step S23, the signal processing section 103 causes the display 104 to display the HDR video for which the luminance compression has been performed. The displaying of the HDR video is continued until the reproduction of the HDR content ends.

<6-2. Configuration and Operation of Recording Apparatus>

Figure 29:
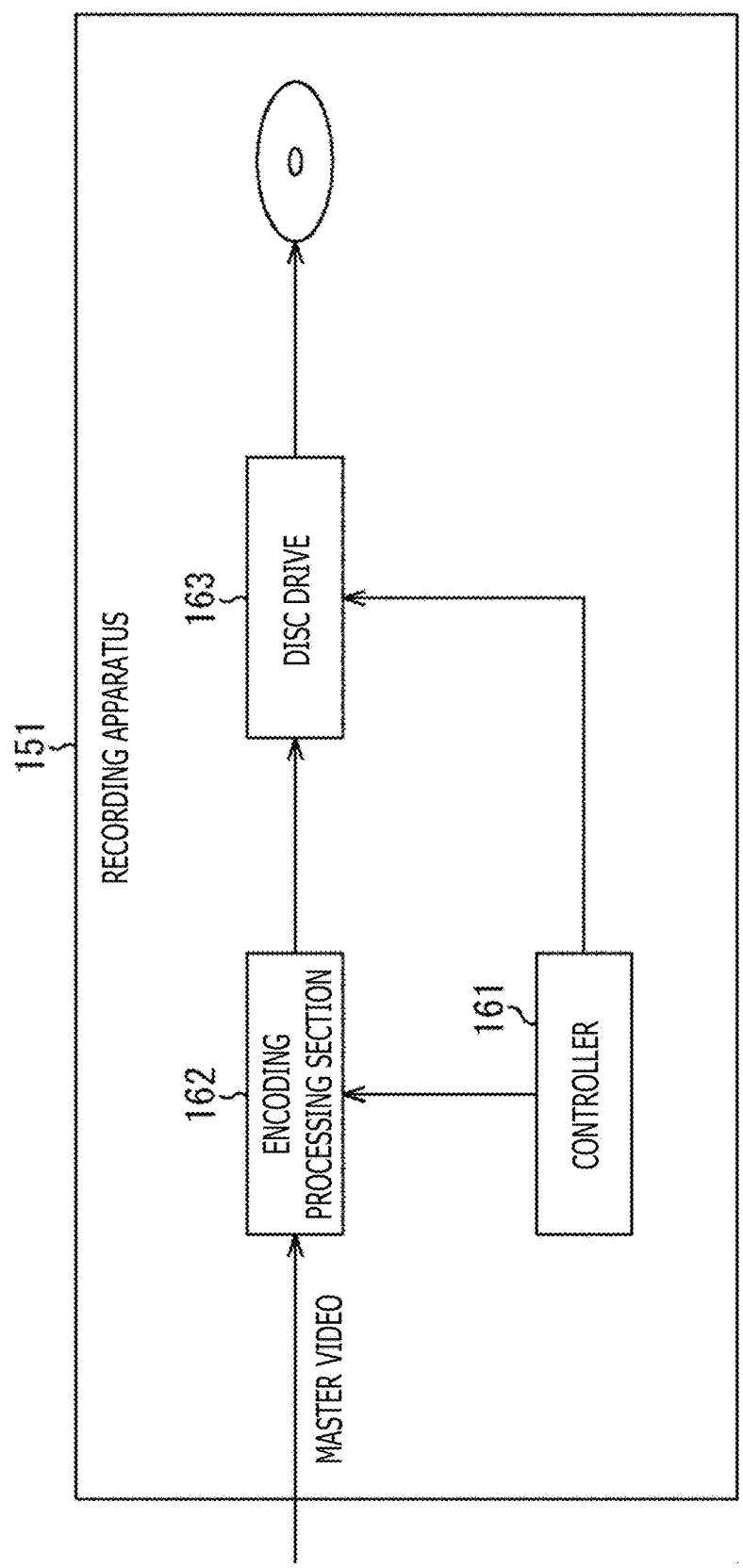
FIG. 29 is a block diagram depicting a configuration example of a recording apparatus.

FIG. 29 is a block diagram depicting a configuration example of a recording apparatus 151.

The optical disc 11 that is such a BD as described above is generated by the recording apparatus 151 of FIG. 29.

The recording apparatus 151 includes a controller 161, an encoding processing section 162, and a disc drive 163. A video that becomes a master is inputted to the encoding processing section 162.

The controller 161 includes a CPU, a ROM, a RAM, and so forth. The controller 161 executes a predetermined program and controls operation of the entire recording apparatus 151.

The encoding processing section 162 performs encoding of the video of the master to generate a Dynamic HDR video stream or a Static HDR video stream. Dynamic metadata that is added to pictures upon generation of a Dynamic HDR video stream and encoded as an SEI message is supplied from the controller 161.

The encoding processing section 162 generates an AV stream that configures a Clip by multiplexing an HDR video stream obtained by performing encoding together with an audio stream and so forth. The encoding processing section 162 outputs the generated AV stream to the disc drive 163.

The disc drive 163 records files of the Data Base information supplied from the controller 161 and files of AV streams supplied from the encoding processing section 162 in accordance with the directory structure of FIG. 15 on the optical disc 11.

Figure 30:
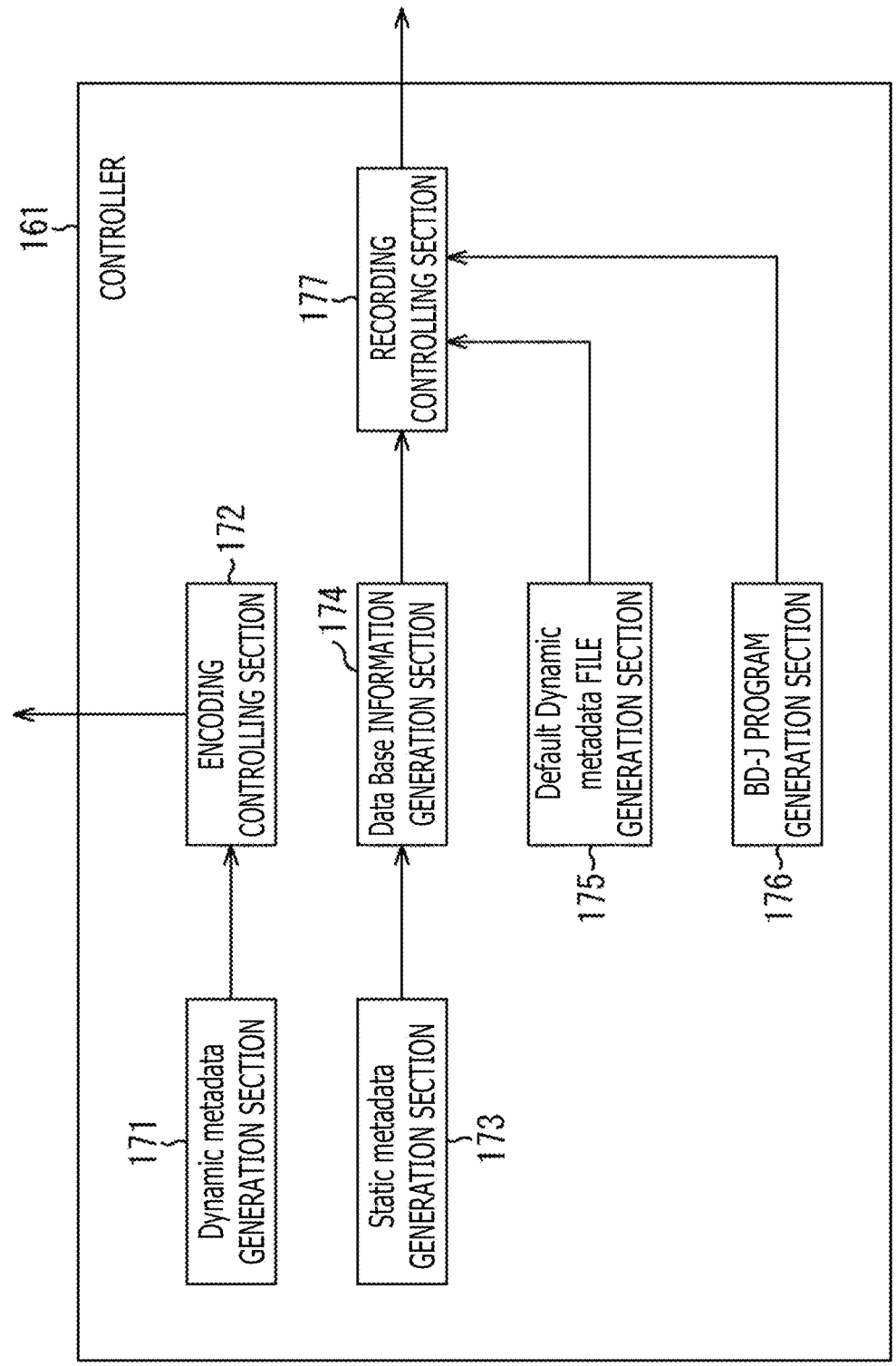
FIG. 30 is a block diagram depicting a functional configuration example of a controller of FIG. 29.

FIG. 30 is a block diagram depicting a functional configuration example of the controller 161.

In the controller 161, a Dynamic metadata generation section 171, an encoding controlling section 172, a Static metadata generation section 173, a Data Base information generation section 174, a Default Dynamic metadata file generation section 175, a BD-J program generation section 176, and a recording controlling section 177 are implemented. At least part of the functioning sections depicted in FIG. 30 is implemented by a predetermined program executed by the CPU of the controller 161.

The Dynamic metadata generation section 171 sets, upon creation of a Dynamic HDR content, values of parameters in accordance with an input by a creator of the content and generates Dynamic metadata. The Dynamic metadata generation section 171 outputs the generated Dynamic metadata to the encoding controlling section 172.

The encoding controlling section 172 outputs the Dynamic metadata generated by the Dynamic metadata generation section 171 to the encoding processing section 162 such that encoding of a Dynamic HDR video stream is performed.

The Static metadata generation section 173 sets, upon creation of a Static HDR content, values of parameters in accordance with an input by the creator of the content and generates Static metadata. The Static metadata generation section 173 outputs the generated Static metadata to the Data Base information generation section 174.

The Data Base information generation section 174 generates Data Base information of the Index table, the PlayList, the Clip Information, and so forth.

For example, the Data Base information generation section 174 sets values of the bits of the HDR_content_exist_flags in response to a type of an HDR content to be recorded on the optical disc 11 and generates an Index table including the HDR_content_exist_flags. Further, the Data Base information generation section 174 generates a Playlist including the Static metadata generated by the Static metadata generation section 173.

The Data Base information generation section 174 outputs a file of the generated Data Base information to the recording controlling section 177.

The Default Dynamic metadata file generation section 175 generates a Default Dynamic metadata file f1 that is a file for pseudo Dynamic metadata generation and outputs the Default Dynamic metadata file f1 to the recording controlling section 177. The generation of the Default Dynamic metadata file f1 by the Default Dynamic metadata file generation section 175 is performed in the case where pseudo Dynamic metadata is to be generated by the third generation method by the reproduction apparatus 1.

The BD-J program generation section 176 generates a program for pseudo Dynamic metadata generation and outputs a JAR file including the generated BD-J program to the recording controlling section 177. The generation of the program for pseudo Dynamic metadata generation is performed using the classes described hereinabove. Generation of the program for pseudo Dynamic metadata generation by the BD-J program generation section 176 is performed in the case where pseudo Dynamic metadata is generated by the fourth generation method by the reproduction apparatus 1.

The recording controlling section 177 outputs the file of the Data Base information generated by the Data Base information generation section 174 to the disc drive 163 so as to be recorded on the optical disc 11. To the disc drive 163, also the Default Dynamic metadata file f1 generated by the Default Dynamic metadata file generation section 175 and the JAR file including the program for pseudo Dynamic metadata generation generated by the BD-J program generation section 176 are suitably supplied such that they are recorded on the optical disc 11.

Figure 31:
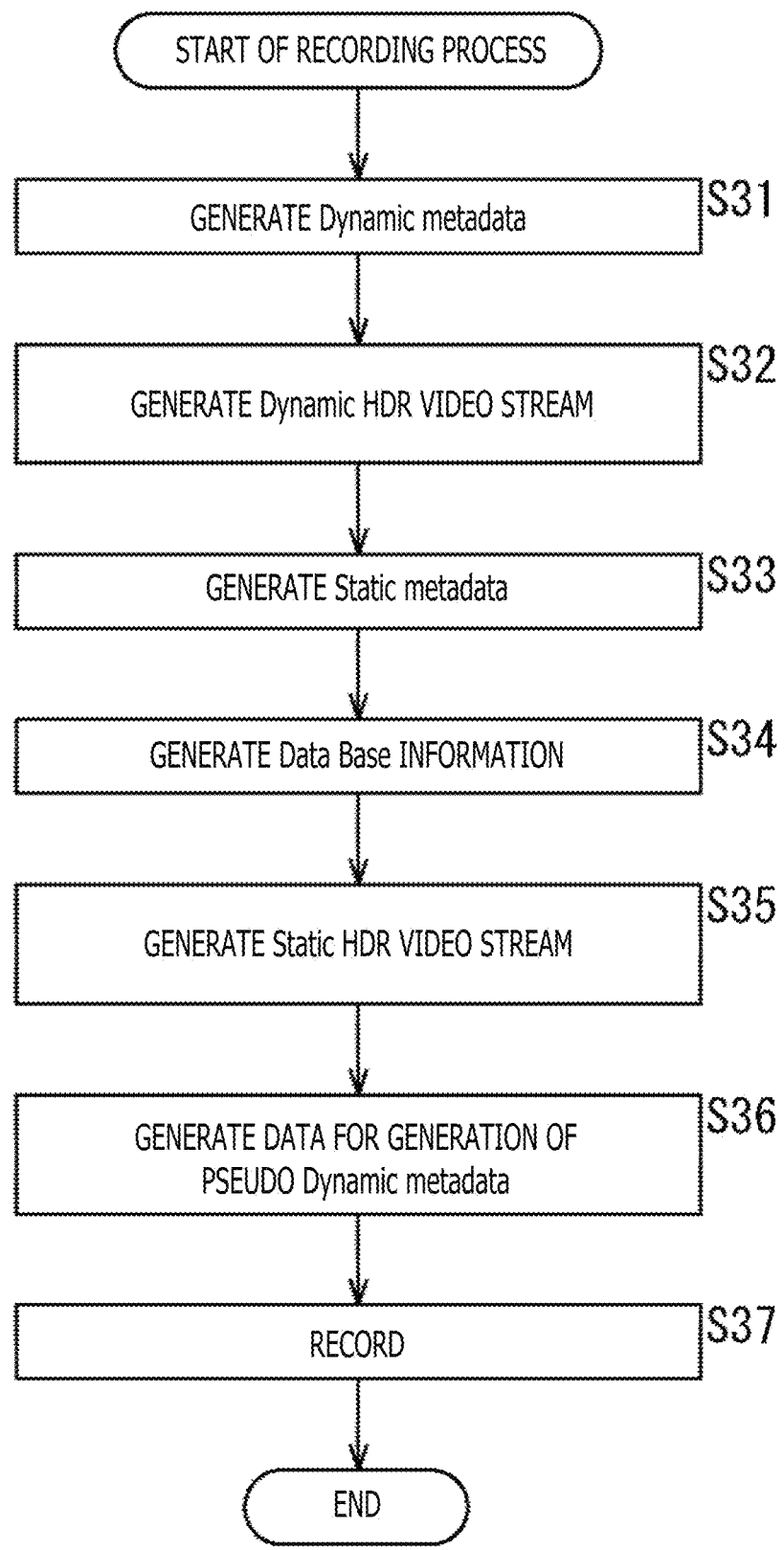
FIG. 31 is a flow chart illustrating a recording process of the recording apparatus.

A recording process of the recording apparatus 151 having such a configuration as described above is described with reference to a flow chart of FIG. 31.

Here, it is assumed that a Dynamic HDR content and a Static HDR content are recorded in a mixed manner on the optical disc 11. The process of FIG. 31 is started, for example, when video data that becomes a master is inputted.

At step S31, the Dynamic metadata generation section 171 of the controller 161 sets values of the parameters in accordance with an input by a creator of the content and generates Dynamic metadata.

At step S32, the encoding processing section 162 performs encoding of the video of the master to generate a Dynamic HDR video stream.

At step S33, the Static metadata generation section 173 sets values of the parameters in accordance with an input by the creator of the content and generates Static metadata.

At step S34, the Data Base information generation section 174 generates Data Base information of a PlayList including the Index table including the HDR_content_exist_flags and the Static metadata generated by the Static metadata generation section 173.

At step S35, the encoding processing section 162 performs encoding of the video of the master to generate a Static HDR video stream.

At step S36, generation of data for pseudo Dynamic metadata generation is performed. In particular, in the case where generation of pseudo Dynamic metadata is to be performed by the third generation method, the Default Dynamic metadata file generation section 175 generates a Default Dynamic metadata file f1. On the other hand, in the case where generation of pseudo Dynamic metadata is to be performed by the fourth generation method, the BD-J program generation section 176 generates a program for pseudo Dynamic metadata generation.

At step S37, the disc drive 163 generates the optical disc 11 by recording the file supplied from the controller 161 and the file of the AV stream supplied from the encoding processing section 162. Thereafter, the process is ended.

By the process described above, even in the case where a Dynamic HDR content and a Static HDR content are recorded in a mixed manner and the Static HDR content is to be reproduced, the recording apparatus 151 can generate the optical disc 11 that does not cause darkening of display.

7. Other Configuration Examples of Reproduction System

<7-1. First Configuration Example>

Although the case in which an HDR content is recorded on the optical disc 11 is described, the process described hereinabove can be applied also to a case in which an HDR content delivered through a network is reproduced.

Figure 32:
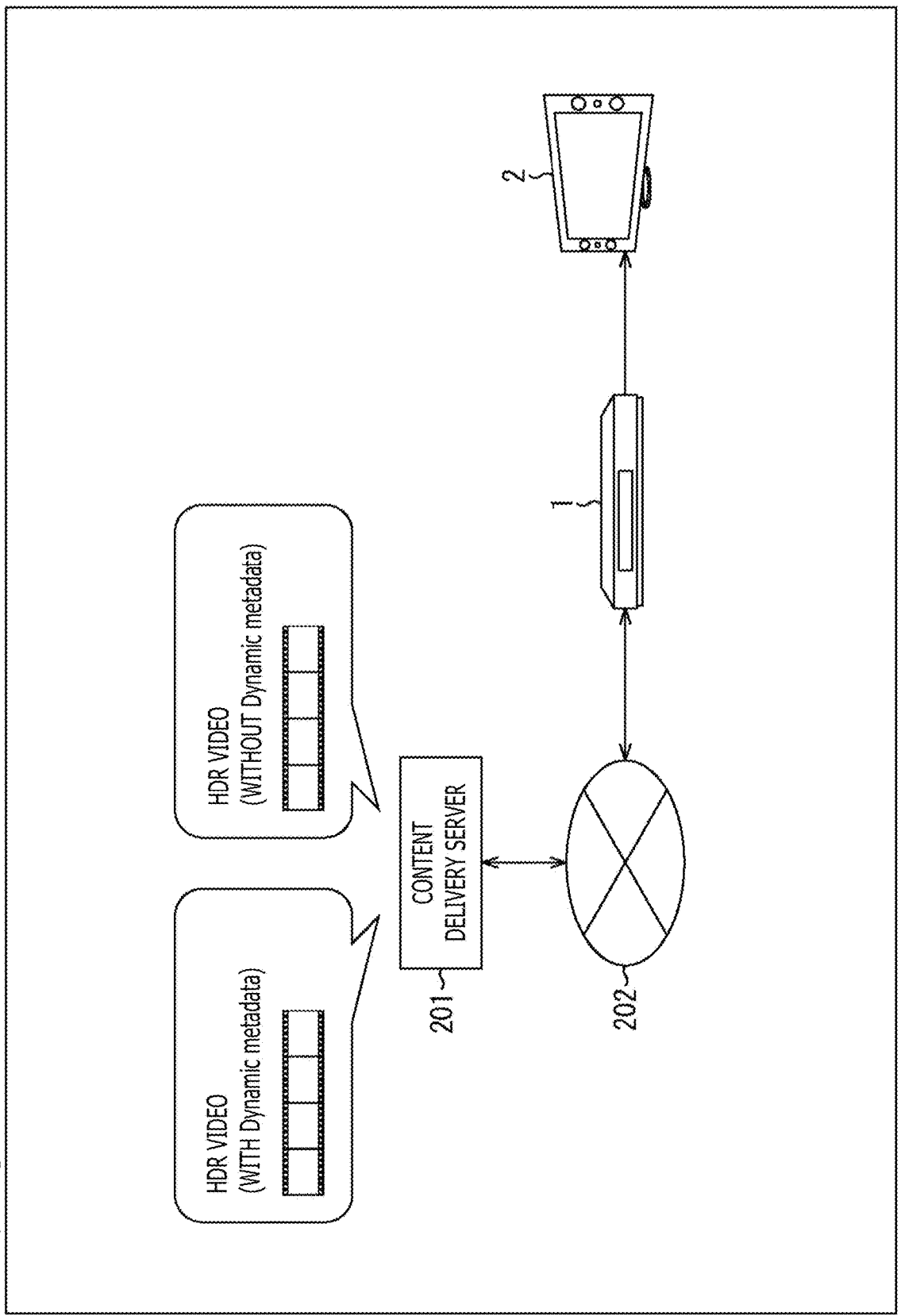
FIG. 32 is a view depicting a configuration example of another reproduction system for an HDR content.

FIG. 32 is a view depicting a configuration example of another reproduction system for an HDR content.

The reproduction system of FIG. 32 includes the reproduction apparatus 1 and a content delivery server 201 connected to each other by a network 202 such as the Internet. Similarly to the case described hereinabove with reference to FIG. 11 and so forth, the TV 2 is connected to the reproduction apparatus 1 through an HDMI cable or the like. An image of an HDR content reproduced by the reproduction apparatus 1 is displayed on the TV 2.

The content delivery server 201 is a server managed by a business operator who provides a delivery service of HDR contents. As indicated in balloons of FIG. 32, HDR contents that can be delivered by the content delivery server 201 include a Dynamic HDR content and a Static HDR content.

Figure 33:
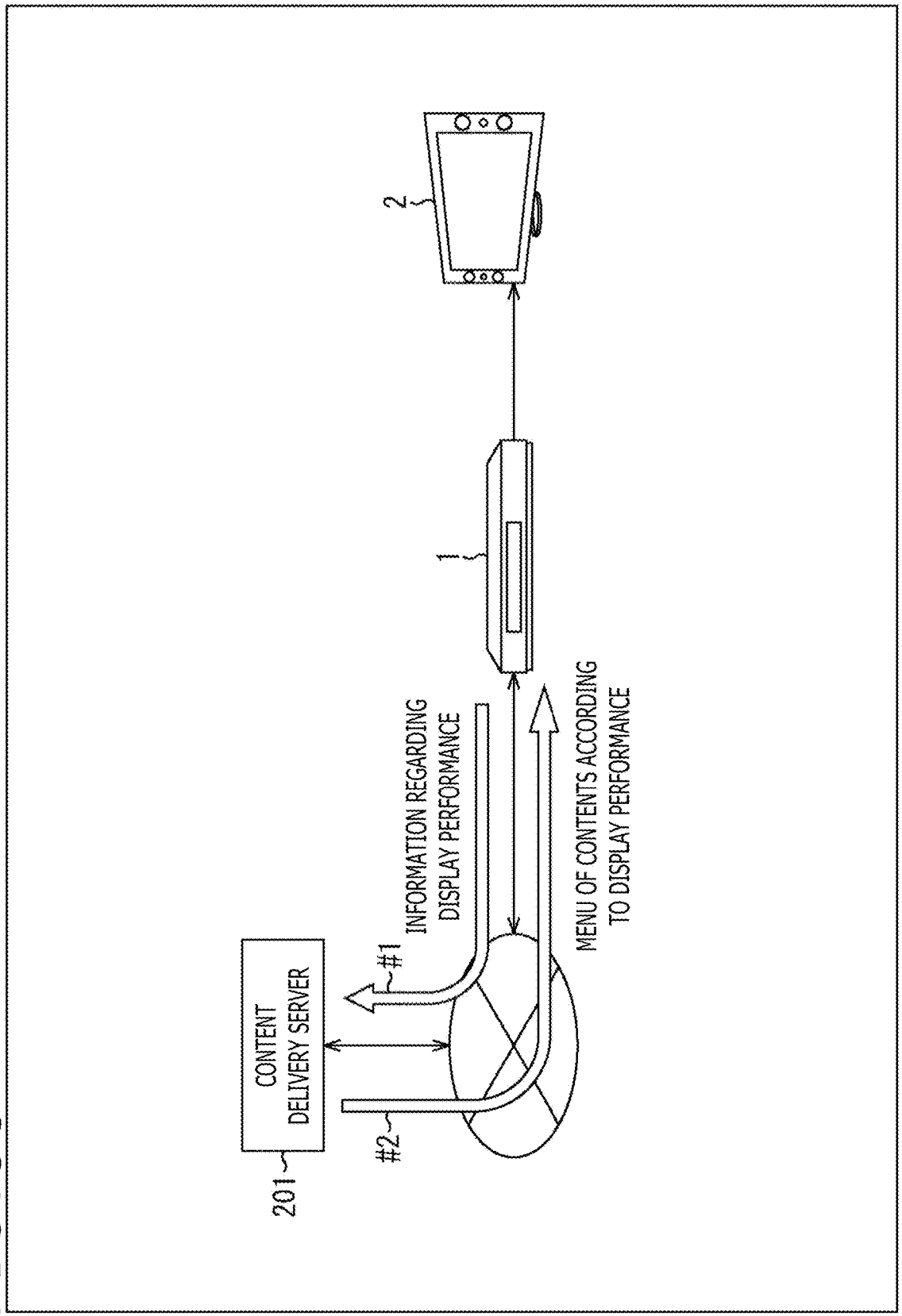
FIG. 33 is a view depicting an example of information transferred between the reproduction apparatus and a content delivery server.

For example, in a case where a user operates the reproduction apparatus 1 to access the content delivery server 201, information relating to performances on the reproduction side including the highest luminance of the display the TV 2 has is transmitted to the content delivery server 201 as indicated by an arrow mark #1 in FIG. 33.

In a case where the reproduction apparatus 1 is ready for reproduction of an HDR content and it is specified that the TV 2 that is an outputting destination device is ready for display of an HDR content, the content delivery server 201 transmits information of a menu of contents according to the performances of the reproduction side as indicated by an arrow mark #2. The menu transmitted from the content delivery server 201 includes Dynamic HDR contents and Static HDR contents.

The reproduction apparatus 1 causes the TV 2 to display a menu screen image including the Dynamic HDR contents and the Static HDR contents on the basis of the information transmitted thereto from the content delivery server 201. The user of the reproduction apparatus 1 can select and view a predetermined HDR content from among the contents including the Dynamic HDR contents and the Static HDR contents.

In particular, the HDR contents that can be viewed by the user of the reproduction apparatus 1 include Dynamic HDR contents and Static HDR contents in a mixed manner.

For example, in a case where a Dynamic HDR content is selected by the user of the reproduction apparatus 1, the content delivery server 201 transmits the selected Dynamic HDR content to the reproduction apparatus 1.

The reproduction apparatus 1 receives the Dynamic HDR content transmitted thereto from the content delivery server 201 and performs a process similar to the reproduction process described hereinabove to perform reproduction of the Dynamic HDR content.

From the reproduction apparatus 1, Dynamic metadata is transmitted together with pictures of the Dynamic HDR content to the TV 2, and luminance compression is performed suitably on the basis of the Dynamic metadata.

On the other hand, in a case where a Static HDR content is selected by the user of the reproduction apparatus 1, the content delivery server 201 transmits the selected Static HDR content to the reproduction apparatus 1. The Static HDR content transmitted from the content delivery server 201 includes Static metadata.

The reproduction apparatus 1 receives the Static HDR content transmitted thereto from the content delivery server 201 and performs a process similar to the reproduction process described hereinabove to perform reproduction of the Static HDR content.

In particular, in the case where pseudo Dynamic metadata is to be generated by the first generation method, the reproduction apparatus 1 sets default values as the values for the parameters and generates pseudo Dynamic metadata.

On the other hand, in the case where pseudo Dynamic metadata is to be generated by the second generation method, the reproduction apparatus 1 uses values of the parameters included in the Static metadata and the default values to generate pseudo Dynamic metadata.

In the case where pseudo Dynamic metadata is to be generated by the third generation method, the reproduction apparatus 1 generates pseudo Dynamic metadata using the Default Dynamic metadata file f1 transmitted as data for pseudo Dynamic metadata generation from the content delivery server 201. In this case, the content delivery server 201 transmits the Default Dynamic metadata file f1 to the reproduction apparatus 1 together with the Static HDR content.

In the case where pseudo Dynamic metadata is to be generated by the fourth generation method, the reproduction apparatus 1 executes the program for pseudo Dynamic metadata generation transmitted from the content delivery server 201 to generate pseudo Dynamic metadata. In this case, the content delivery server 201 transmits the program for pseudo Dynamic metadata generation to the reproduction apparatus 1 together with the Static HDR content.

From the reproduction apparatus 1, the pseudo Dynamic metadata is transmitted together with pictures of the Static HDR content to the TV 2, and luminance compression is performed suitably on the basis of the pseudo Dynamic metadata.

In this manner, in the case where a Dynamic HDR content and a Static HDR content are included in a mixed manner in reproducible HDR contents, when a Static HDR content is to be reproduced, the reproduction apparatus 1 behaves as if Dynamic metadata were included in an HDR video stream. In other words, even in the case in which a Static HDR content is to be reproduced, the reproduction apparatus 1 outputs Dynamic metadata (pseudo Dynamic metadata) similarly to the case upon reproduction of a Dynamic HDR content.

By performing, upon reproduction of a Static HDR content, operation similar to that upon reproduction of a Dynamic HDR content, it is possible to eliminate transmission setting of HDMI and changeover of the display mode and prevent darkening of display.

It is to be noted that, although, in the example of FIG. 32, only the reproduction apparatus 1 is depicted as a terminal of a user that utilizes a delivery service provided by the content delivery server 201, actually it is possible to utilize the delivery service from various terminals.

Here, a process of the reproduction apparatus 1 for reproducing an HDR content delivered from the content delivery server 201 is described with reference to a flow chart of FIG. 34.

Figure 34:
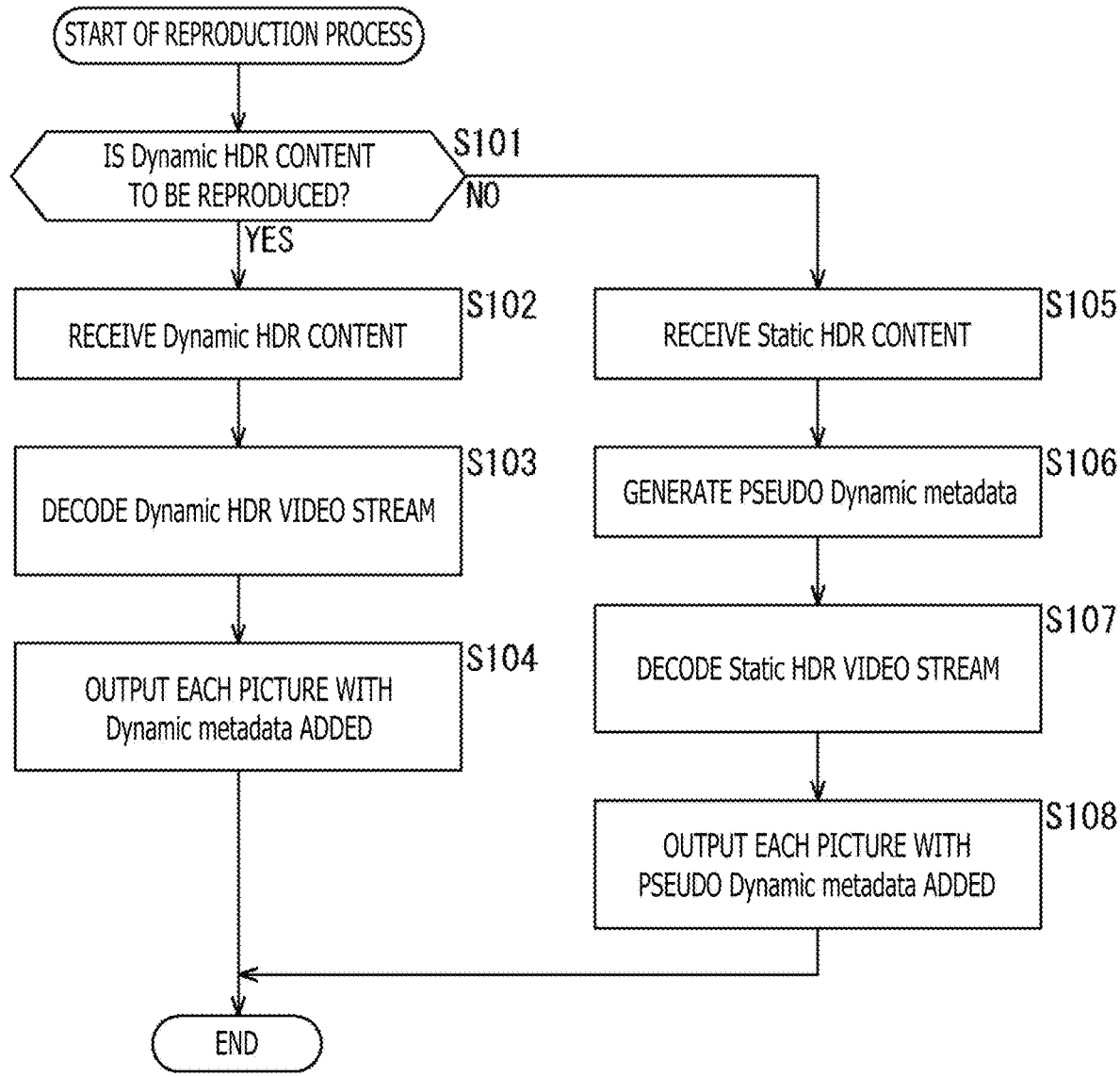
FIG. 34 is a flow chart illustrating a reproduction process of the reproduction apparatus.

The process of FIG. 34 is started, for example, when the menu screen image of HDR contents is displayed on the TV 2 on the basis of the information transmitted from the content delivery server 201.

At step S101, the controller 51 decides whether or not a Dynamic HDR content is to be reproduced.

In a case where a Dynamic HDR content is selected by the user and it is decided at step S101 that the Dynamic HDR content is to be reproduced, the process advances to step S102. The controller 51 controls the communication section 55 to transmit information of the selected Dynamic HDR content to the content delivery server 201. From the content delivery server 201, the Dynamic HDR content selected by the user is transmitted to the reproduction apparatus 1.

At step S102, the communication section 55 receives the Dynamic HDR content transmitted from the content delivery server 201. The AV stream of the received Dynamic HDR content is supplied to the decoding processing section 56 through the controller 51.

At step S103, the decoding processing section 56 decodes the Dynamic HDR video stream separated from the AV stream and outputs pictures to the external outputting section 58. The decoding processing section 56 outputs Dynamic metadata included in the Dynamic HDR video stream to the controller 51.

At step S104, the external outputting section 58 adds the Dynamic metadata supplied from the controller 51 to the pictures obtained by decoding the Dynamic HDR video stream and outputs the resulting pictures. The outputting of pictures of the Dynamic HDR content is repeated until the reproduction of the HDR content ends.

On the other hand, in a case where a Static HDR content is selected by the user and therefore it is decided at step S101 that the Static HDR content is to be reproduced, the process advances to step S105. The controller 51 controls the communication section 55 to transmit information of the selected Static HDR content to the content delivery server 201. From the content delivery server 201, the Static HDR content selected by the user is transmitted to the reproduction apparatus 1.

At step S105, the communication section 55 receives the Static HDR content transmitted from the content delivery server 201. The AV stream of the received Static HDR content is supplied to the decoding processing section 56 through the controller 51.

At step S106, the controller 51 generates pseudo Dynamic metadata by any one of the first to fourth generation methods described hereinabove.

At step S107, the decoding processing section 56 decodes the Static HDR video stream separated from the AV stream and outputs data of pictures to the external outputting section 58.

At step S108, the external outputting section 58 adds the pseudo Dynamic metadata, supplied from the controller 51, to the pictures obtained by decoding the Static HDR video stream and outputs the resulting pictures. The outputting of pictures of the Static HDR content is repeated until the reproduction of the HDR content ends.

By the process described above, even in the case where a Dynamic HDR content and a Static HDR content exist in a mixed manner in reproducible HDR contents and the Static HDR content is to be reproduced, the reproduction apparatus 1 can transmit metadata similar to Dynamic metadata to the TV 2.

By transmitting metadata similar to Dynamic metadata, even in the case where the reproduction target is changed over between a Dynamic HDR content and a Static HDR content, darkening of display can be prevented.

Figure 35:
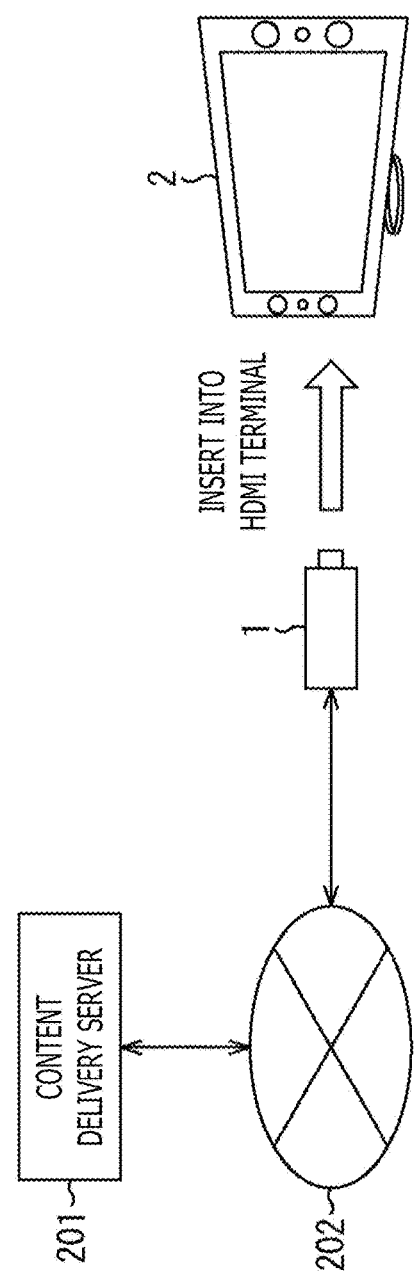
FIG. 35 is a view depicting another configuration example of the reproduction apparatus.

FIG. 35 is a view depicting another configuration example of the reproduction apparatus 1.

As depicted in FIG. 35, the reproduction apparatus 1 may be a terminal of the so-called stick type. An HDMI terminal is provided on a housing of the reproduction apparatus 1 depicted in FIG. 35. By inserting the HDMI terminal provided on the housing into an HDMI terminal of the TV 2, the reproduction apparatus 1 and the TV 2 are connected to each other.

In this case, from among the components depicted in FIG. 24, for example, the components other than the disc drive 52 are provided in the reproduction apparatus 1. The reproduction apparatus 1 performs reproduction of an HDR content delivered from the content delivery server 201 by performing the process described hereinabove with reference to FIG. 34 and so forth.

In this manner, various forms can be adopted as the form of the reproduction apparatus 1. For example, the functions of the reproduction apparatus 1 may be incorporated in a terminal of the portable type such as a smartphone or a tablet terminal or the functions of the reproduction apparatus 1 may be incorporated in a terminal such as a PC.

<7-2. Second Configuration Example>

The functions of the reproduction apparatus 1 may be incorporated in the TV 2.

Figure 36:
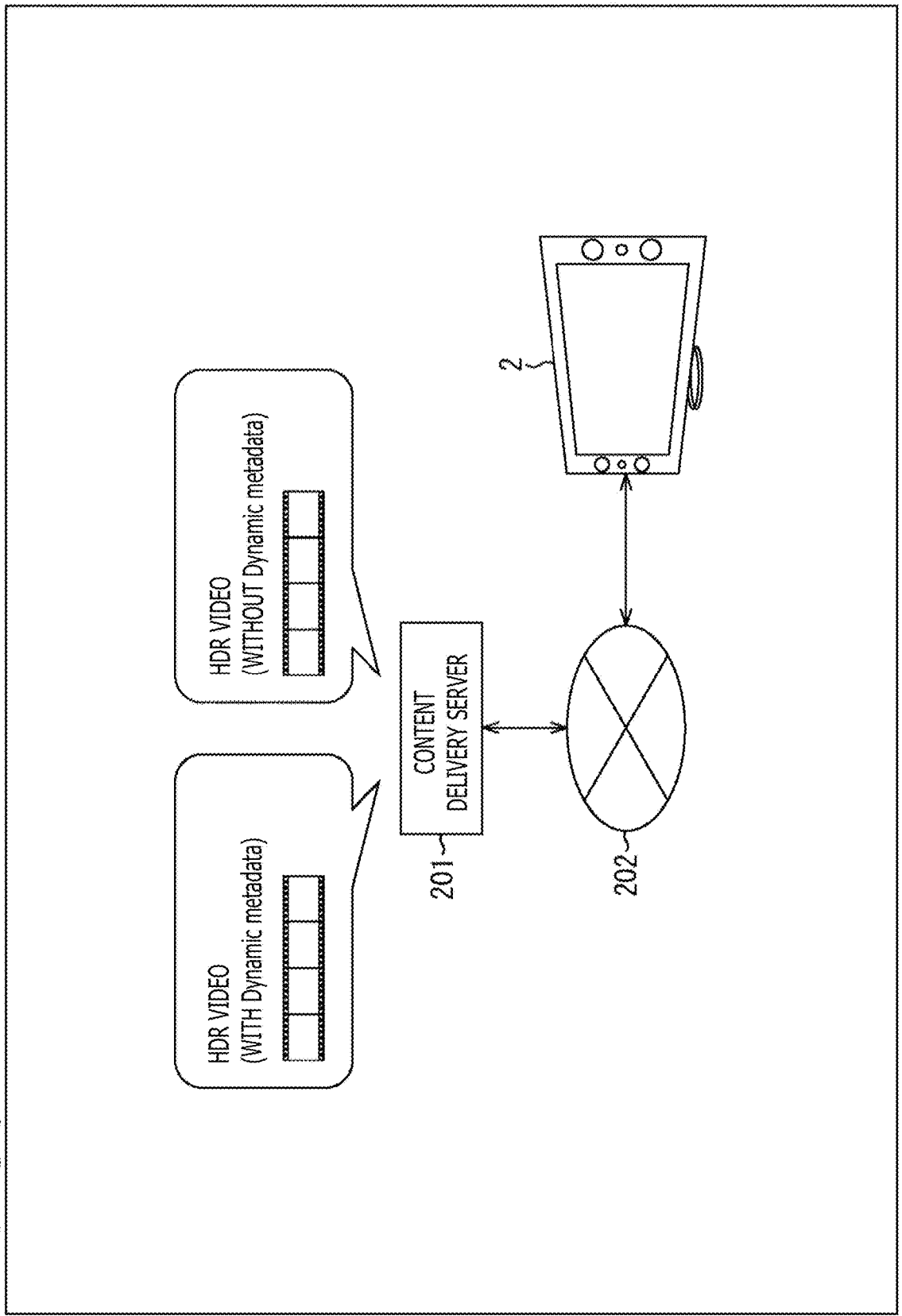
FIG. 36 is a view depicting a configuration example of a further reproduction system for an HDR content.

FIG. 36 is a view depicting a configuration example of a further reproduction system for an HDR content.

The reproduction system of FIG. 36 includes the TV 2 in which the functions of the reproduction apparatus 1 are incorporated and the content delivery server 201 connected to each other through the network 202. Overlapping description is suitably omitted.

The TV 2 causes a menu screen image, which includes a Dynamic HDR content and a Static HDR content, to be displayed on the basis of information transmitted from the content delivery server 201. The user of the TV 2 can select and view a predetermined HDR content from among contents including Dynamic HDR contents and Static HDR contents.

In particular, the HDR contents that can be viewed by the user of the TV 2 include Dynamic HDR contents and Static HDR contents in a mixed manner.

For example, in a case where a Dynamic HDR content is selected, the content delivery server 201 transmits the selected Dynamic HDR content to the TV 2.

The TV 2 receives the Dynamic HDR content transmitted from the content delivery server 201 and performs reproduction of the Dynamic HDR content. For example, the TV 2 decodes a Dynamic HDR video stream and suitably performs luminance compression of pictures on the basis of Dynamic metadata and then causes an image to be displayed.

On the other hand, in a case where a Static HDR content is selected, the content delivery server 201 transmits the selected Static HDR content to the TV 2. The Static HDR content transmitted from the content delivery server 201 includes Static metadata.

The TV 2 receives the Static HDR content transmitted from the content delivery server 201 and performs reproduction of the Static HDR content. For example, the TV 2 generates pseudo Dynamic metadata by a method same as one of the first to fourth generation methods described hereinabove. The TV 2 decodes a Static HDR video stream and suitably performs luminance compression of pictures on the basis of the pseudo Dynamic metadata, and thereafter causes an image to be displayed.

In this manner, even in the case where a Static HDR content is to be reproduced, the TV 2 performs operation same as that upon reproduction of a Dynamic HDR content. Consequently, changeover of the displaying mode becomes unnecessary and darkening of display can be prevented.

Figure 37:
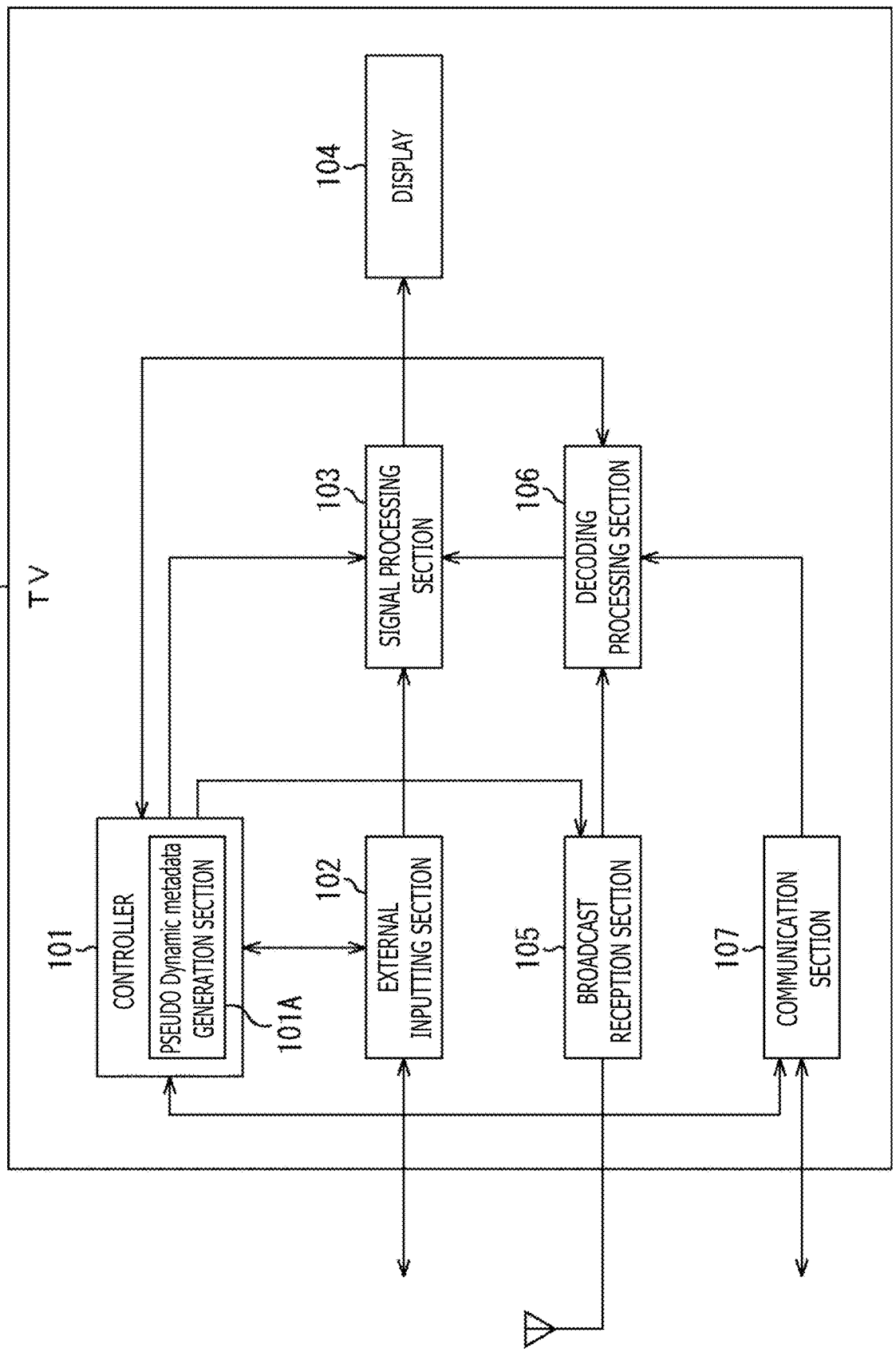
FIG. 37 is a block diagram depicting a configuration example of a TV of FIG. 36.

FIG. 37 is a block diagram depicting a configuration example of the TV 2 of FIG. 36.

From among the components depicted in FIG. 37, the components same as those described hereinabove with reference to FIG. 27 are denoted by the same reference signs. Overlapping description is omitted suitably.

The example of FIG. 37 is different from the configuration depicted in FIG. 27 in that a pseudo Dynamic metadata generation section 101A is provided in the controller 101. The pseudo Dynamic metadata generation section 101A is implemented by a predetermined program executed by the CPU of the controller 101.

In the case where a Static HDR content is to be reproduced, the pseudo Dynamic metadata generation section 101A generates pseudo Dynamic metadata by a method same as one of the first to fourth generation methods. The pseudo Dynamic metadata generation section 101A outputs the generated pseudo Dynamic metadata to the signal processing section 103.

The signal processing section 103 performs luminance compression of pictures obtained by decoding a Static HDR video stream on the basis of the Dynamic metadata generated by the pseudo Dynamic metadata generation section 101A. In the case where it is selected that a Static HDR is to be reproduced, decoding of the Static HDR video stream is performed by the decoding processing section 106, and pictures obtained by the decoding are supplied.

The communication section 107 performs communication with the content delivery server 201 through the network 202 to receive an HDR content transmitted from the content delivery server 201.

The communication section 107 outputs an AV stream included in the HDR content to the decoding processing section 106. Further, in the case where a Static HDR content is to be reproduced, the communication section 107 receives Static metadata transmitted from the content delivery server 201 and outputs the Static metadata to the controller 101.

In a case where data for pseudo Dynamic metadata generation is transmitted from the content delivery server 201 when a Static HDR content is to be reproduced, the communication section 107 receives the data for pseudo Dynamic metadata generation and outputs the data to the controller 101. The pseudo Dynamic metadata generation section 101A of the controller 101 generates pseudo Dynamic metadata by using the data for pseudo Dynamic metadata generation supplied from the communication section 107.

In this manner, the functions of the reproduction apparatus 1 may be provided in the TV 2 such that the process described hereinabove is executed by the TV 2.

8. Other Examples

Although the recording medium in which a Dynamic HDR content and a Static HDR content are recorded in a mixed manner is an optical disc, it may otherwise be another recording medium in which a storage device such as a flash memory is incorporated.

Further, a Dynamic HDR content and a Static HDR content may not be recorded in the physically same recording medium but may be recorded in different recording media. In particular, the process described above can be applied also to a case where one of a Dynamic HDR content and a Static HDR content is recorded in a certain recording medium while the other is recorded in another recording medium and the reproduction apparatus 1 acquires and reproduces an HDR content recorded in any one of the recording media.

Although the case is described in which the luminance of an HDR video transmitted from the reproduction apparatus 1 is compressed by the TV 2, the process described above can be applied also to a case in which such luminance is extended. In this case, the TV 2 performs the extension of the luminance of a picture obtained by decoding a Static HDR video stream on the basis of pseudo Dynamic metadata transmitted from the reproduction apparatus 1.

Further, while it is described in the foregoing description that the reproduction apparatus 1 performs decoding of an HDR video stream, an HDR video stream may be transmitted from the reproduction apparatus 1 to the TV 2 without decoding.

<Configuration Example of Computer>

While the series of processes described above can be executed by hardware, it may otherwise be executed by software. In a case where the series of processes is executed by software, a program that constructs the software is installed into a computer incorporated in hardware for exclusive use, a personal computer for universal use or the like from a program recording medium.

Figure 38:
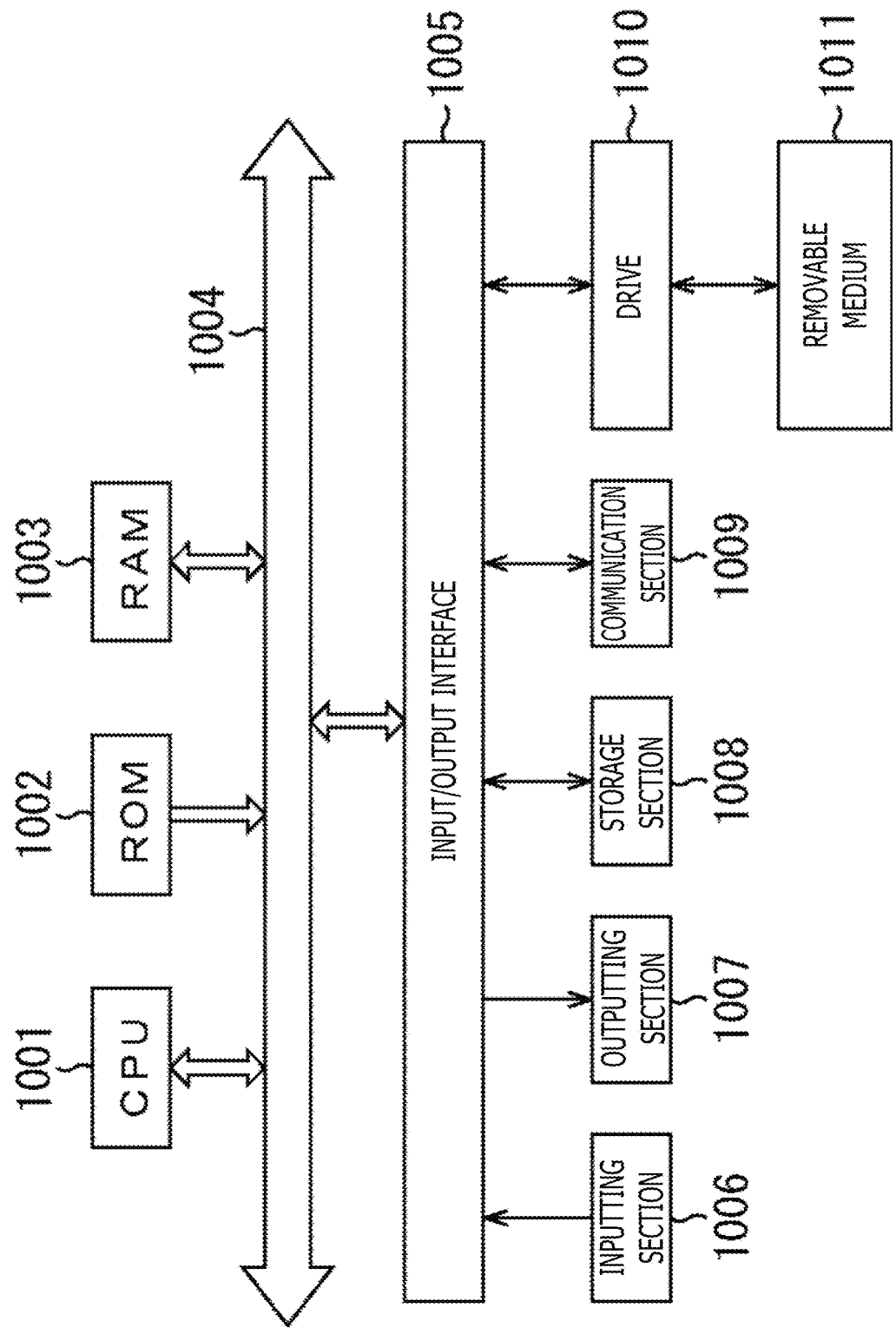
FIG. 38 is a block diagram depicting a configuration example of a computer.

FIG. 38 is a block diagram depicting a hardware configuration example of a computer that executes the series of processes described hereinabove in accordance with a program.

A CPU (Central Processing Unit) 1001, a ROM (Read Only Memory) 1002, and a RAM (Random Access Memory) 1003 are connected to one another by a bus 1004.

Further, an input/output interface 1005 is connected to the bus 1004. An inputting section 1006 including a keyboard, a mouse, and so forth and an outputting section 1007 including a display, a speaker, and so forth are connected to the input/output interface 1005. Further, a storage section 1008 including a hard disk, a nonvolatile memory, or the like, a communication section 1009 including a network interface or the like, and a drive 1010 that drives a removable medium 1011 are connected to the input/output interface 1005.

In the computer configured in such a manner as described above, the CPU 1001 loads a program stored, for example, in the storage section 1008 into the RAM 1003 through the input/output interface 1005 and the bus 1004 and executes the program to perform the series of processes described above.

The program to be executed by the CPU 1001 is recorded on and provided as, for example, a removable medium 1011 or is provided through a wired or wireless transmission medium such as a local area network, the Internet, or digital broadcasting and is installed into the storage section 1008.

It is to be noted that the program to be executed by the computer may be a program by which the processes are performed in a time series in the order as described in the present specification or may be a program by which the processes are executed in parallel or executed individually at necessary timings such as when the process is called.

It is to be noted that the embodiment of the present technology is not restricted to the embodiment described hereinabove and can be modified in various manners without departing from the subject matter of the present technology.

For example, the present technology can assume a configuration for cloud computing in which one function is shared and processed cooperatively by a plurality of apparatuses through a network.

Further, each of the steps described hereinabove in connection with the flow charts not only can be executed by a single apparatus but also can be shared and executed by a plurality of apparatuses.

Furthermore, in a case where a plurality of processes is included in one step, the plurality of processes included in the one step not only can be executed by one apparatus but also can be shared and executed by a plurality of apparatuses.

In the present specification, the term system signifies a set of a plurality of components (devices, modules (parts), or the like) and it does not matter whether or not all components are included in the same housing. Accordingly, not only a plurality of devices accommodated in individual separate housings and connected to each other through a network but also one apparatus including a plurality of modules accommodated in one housing is a system.

The advantageous effects described in the present specification are exemplary to the last and are not restrictive, and other advantageous effects may be applicable.

<Examples of Combination of Components>

The present technology can also assume the following configurations.

(1)

A reproduction apparatus including:

a decoding section decoding, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream; and an output controlling section adding the dynamic metadata to video data obtained by the decoding and outputting resulting data to a display apparatus.

(2)

The reproduction apparatus according to (1) above, in which the output controlling section adds the dynamic metadata in which default values are set as values of parameters.

(3)

The reproduction apparatus according to (1) above, in which the output controlling section adds the dynamic metadata in which values of parameters included in the static metadata are set as values of parameters.

(4)

The reproduction apparatus according to (1) above, in which the output controlling section adds the dynamic metadata described in a metadata file prepared in advance as data for being added upon reproduction of the second content.

(5)

The reproduction apparatus according to (4) above, further including:

a reading out section reading out data from a recording medium in which the first content and the second content are recorded, in which the output controlling section adds the dynamic metadata described in the metadata file read out from the recording medium.

(6)

The reproduction apparatus according to (1) above, further including:

a program execution section executing a program prepared in an associated relation with the second content and setting values of parameters to generate the dynamic metadata, in which the output controlling section adds the dynamic metadata generated by the execution of the program.

(7)

The reproduction apparatus according to (6) above, in which the program includes a program of BD-J.

(8)

The reproduction apparatus according to any one of (1) to (7) above, further including:

a communication section performing communication with a delivery server that provides a delivery service of contents including the first content and the second content, in which the decoding section decodes the second HDR video stream included in the second content transmitted from the delivery server and received by the communication section.

(9)

The reproduction apparatus according to any one of (1) to (8) above, in which in a case where the first content is to be reproduced in place of the second content, the decoding section decodes the first HDR video stream, and the output controlling section adds the dynamic metadata added to the first HDR video stream to video data obtained by the decoding and outputs resulting data.

(10)

The reproduction apparatus according to any one of (1) to (9) above, in which the output controlling section outputs video data obtained by decoding the second HDR video stream and the dynamic metadata to the display apparatus through an HDMI interface.

(11)

A reproduction method performed by a reproduction apparatus, including:

decoding, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream; and adding the dynamic metadata to video data obtained by the decoding and outputting resulting data to a display apparatus.

(12)

A program for causing a computer to execute processes of:

decoding, in a case where a first content including a first HDR video stream to which dynamic metadata including luminance information of a unit of a video frame is added and a second content including a second HDR video stream to which the dynamic metadata is not added and with which static metadata including luminance information of a unit of a content is associated are included in reproducible contents and the second content is to be reproduced, the second HDR video stream; and adding the dynamic metadata to video data obtained by the decoding and outputting resulting data to a display apparatus.

(13)

A recording medium having recorded therein:

a first HDR video stream to which dynamic metadata including luminance information of a unit of a video frame is added;

a second HDR video stream to which the dynamic metadata is not added and with which static metadata including luminance information of a unit of a content is associated;

a playlist file having the static metadata described therein, the playlist file including reproduction re-controlling information of the second HDR video stream; and an index file in which a flag representative of a type of an HDR video stream is described, the index file including a bit indicative of whether or not the first HDR video stream is recorded and a bit indicative of whether or not the second HDR video stream is recorded.

(14)

The recording medium according to (13) above, further having recorded therein:

a metadata file in which the dynamic metadata for being added to video data obtained by decoding the second HDR video stream in a reproduction apparatus that is to reproduce the second HDR video stream is placed.

(15)

The recording medium according to (13) above, further having recorded therein:
a file of a program for generating the dynamic metadata to be added to video data obtained by decoding the second HDR video stream, the program being executed by a reproduction apparatus that is to reproduce the second HDR video stream.

(16)

The recording medium according to any one of (13) to (15) above, in which
the recording medium includes a BD-ROM disc.

REFERENCE SIGNS LIST

1 Reproduction apparatus, 2 TV, 51 Controller, 52 Disc drive, 53 Memory, 54 Local storage, 55 Communication section, 56 Decoding processing section, 57 Operation inputting section, 58 External outputting section, 71 Data Base information analysis section, 72 Pseudo Dynamic metadata generation section, 73 BD-J program execution section, 74 Output controlling section

The invention claimed is:

1. A reproduction apparatus comprising:
a decoding section configured to decode, in a case where a first content including a first HDR video stream to which dynamic metadata including respective luminance information of each respective video frame is added and a second content including a second HDR video stream to which the dynamic metadata is not added and with which static metadata including average luminance information of a unit of overall content is associated are included in reproducible contents and the second content is to be reproduced, the second HDR video stream; and
an output controlling section configured to
add the dynamic metadata of the first HDR video stream to each respective video frame of video data obtained by the decoding of the second HDR video stream, and
output resulting data to a display apparatus,
wherein the decoding section and the output controlling section are each implemented via at least one processor.

2. The reproduction apparatus according to claim 1, wherein
the output controlling section adds the dynamic metadata in which default values are set as values of parameters.

3. The reproduction apparatus according to claim 1, wherein
the output controlling section adds the dynamic metadata in which values of parameters included in the static metadata are set as values of parameters.

4. The reproduction apparatus according to claim 1, wherein
the output controlling section adds the dynamic metadata described in a metadata file prepared in advance as data for being added upon reproduction of the second content.

5. The reproduction apparatus according to claim 4, further comprising:
a reading out section configured to read out data from a non-transitory recording medium in which the first content and the second content are recorded,
wherein the output controlling section adds the dynamic metadata described in the metadata file read out from the non-transitory recording medium, and
wherein the reading out section is implemented via at least one processor.

6. The reproduction apparatus according to claim 1, further comprising:
a program execution section configured to
execute a program prepared in an associated relation with the second content, and
set values of parameters to generate the dynamic metadata,
wherein the output controlling section adds the dynamic metadata generated by the execution of the program, and
wherein the output controlling section is implemented via at least one processor.

7. The reproduction apparatus according to claim 6, wherein
the program includes a program of BD-J.

8. The reproduction apparatus according to claim 1, further comprising:
a communication section configured to perform communication with a delivery server that provides a delivery service of contents including the first content and the second content,
wherein the decoding section decodes the second HDR video stream included in the second content transmitted from the delivery server and received by the communication section, and
wherein the communication section is implemented via at least one processor.

9. The reproduction apparatus according to claim 1, wherein,
in a case where the first content is to be reproduced in place of the second content,
the decoding section decodes the first HDR video stream, and
the output controlling section adds the dynamic metadata added to the first HDR video stream to video data obtained by the decoding and outputs resulting data.

10. The reproduction apparatus according to claim 1, wherein
the output controlling section outputs video data obtained by decoding the second HDR video stream and the dynamic metadata to the display apparatus through an HDMI interface.

11. The reproduction apparatus according to claim 1, wherein
the dynamic metadata includes the luminance information designated with respect to at least one shape set within each video frame.

12. A reproduction method performed by a reproduction apparatus, comprising:
decoding, in a case where a first content including a first HDR video stream to which dynamic metadata including respective luminance information of each respective video frame is added and a second content including a second HDR video stream to which the dynamic metadata is not added and with which static metadata including average luminance information of a unit of overall content is associated are included in reproducible contents and the second content is to be reproduced, the second HDR video stream;
adding the dynamic metadata of the first HDR video stream to each respective video frame of video data obtained by the decoding of the second HDR video stream; and
outputting resulting data to a display apparatus.

13. A non-transitory computer-readable storage medium having embodied thereon a program, which when executed by a computer causes the computer to execute a method, the method comprising:
- decoding, in a case where a first content including a first HDR video stream to which dynamic metadata including respective luminance information of each respective video frame is added and a second content including a second HDR video stream to which the dynamic metadata is not added and with which static metadata including average luminance information of a unit of overall content is associated are included in reproducible contents and the second content is to be reproduced, the second HDR video stream;
- adding the dynamic metadata of the first HDR video stream to each respective video frame of video data obtained by the decoding of the second HDR video stream; and
- outputting resulting data to a display apparatus.

14. A non-transitory recording medium having recorded therein:
- a first HDR video stream to which dynamic metadata including respective luminance information of each respective video frame is added;
- a second HDR video stream to which the dynamic metadata is not added and with which static metadata including average luminance information of a unit of overall content is associated;
- a playlist file having the static metadata described therein, the playlist file including reproduction re-controlling information of the second HDR video stream; and
- an index file in which a flag representative of a type of an HDR video stream is described, the index file including a bit indicative of whether or not the first HDR video stream is recorded and a bit indicative of whether or not the second HDR video stream is recorded,
- wherein when the index file includes the bit indicative of the first HDR video stream being recorded and the bit indicative of the second HDR video stream being recorded, the playlist file includes the reproduction re-controlling information of the second HDR video stream by adding the dynamic metadata of the first HDR video stream.

15. The non-transitory recording medium according to claim 14, further having recorded therein:
- a metadata file in which the dynamic metadata for being added to video data obtained by decoding the second HDR video stream in a reproduction apparatus that is to reproduce the second HDR video stream is placed.

16. The non-transitory recording medium according to claim 14, further having recorded therein:
- a file of a program for generating the dynamic metadata to be added to video data obtained by decoding the second HDR video stream, the program being executed by a reproduction apparatus that is to reproduce the second HDR video stream.

17. The non-transitory recording medium according to claim 14, wherein
- the non-transitory recording medium includes a BD-ROM disc.

* * * * *